(12) United States Patent
Hebert et al.

(10) Patent No.: US 11,584,869 B2
(45) Date of Patent: Feb. 21, 2023

(54) SEALANT TAPE

(71) Applicant: 3M INNOVATIVE PROPERTIES COMPANY, St. Paul, MN (US)

(72) Inventors: Larry S. Hebert, Hudson, WI (US); Michael D. Swan, Lake Elmo, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 768 days.

(21) Appl. No.: 16/466,351

(22) PCT Filed: Dec. 14, 2017

(86) PCT No.: PCT/US2017/066278
§ 371 (c)(1),
(2) Date: Jun. 4, 2019

(87) PCT Pub. No.: WO2018/112130
PCT Pub. Date: Jun. 21, 2018

(65) Prior Publication Data
US 2019/0338166 A1    Nov. 7, 2019

Related U.S. Application Data

(60) Provisional application No. 62/433,906, filed on Dec. 14, 2016.

(51) Int. Cl.
*C09J 7/38* (2018.01)
*C09J 5/00* (2006.01)
(Continued)

(52) U.S. Cl.
CPC . *C09J 7/25* (2018.01); *C08J 9/32* (2013.01); *C09J 5/00* (2013.01); *C09J 7/20* (2018.01);
(Continued)

(58) Field of Classification Search
CPC ......... C09J 7/25; C09J 5/00; C09J 7/20; C09J 7/26; C09J 7/38; C09J 7/385; C09J 11/04;
(Continued)

(56) References Cited

U.S. PATENT DOCUMENTS 2,466,963 A   4/1949   Patrick
4,366,307 A   12/1982  Singh
(Continued)

FOREIGN PATENT DOCUMENTS

CA    2170478     9/1996
CN    202642092   1/2013
(Continued)

OTHER PUBLICATIONS

Guanglin, et al, "Packaging Material Science" *State-Compiled Textbook of Package for General Higher Education—Packaging Material Science (Second Edition)* (Aug. 2011) 9 pages including translation.
(Continued)

*Primary Examiner* — Patricia L. Nordmeyer
(74) *Attorney, Agent, or Firm* — Philip P. Soo

(57) ABSTRACT

Various embodiments disclosed related to sealant tape. The sealant tape can include a cured product of a sealant composition including a curable liquid that includes a polysulfide, a polythioether, a copolymer thereof, or a combination thereof. The sealant composition also includes a curing agent for curing the curable liquid. Various embodiments provide cured products of the sealant composition, sealant
(Continued)

tapes including the cured product, and sealant tapes including any suitable material with an adhesive pattern thereon.

16 Claims, 3 Drawing Sheets

(51) Int. Cl.
| | |
|---|---|
| *C09J 11/04* | (2006.01) |
| *C09J 11/08* | (2006.01) |
| *C08J 9/32* | (2006.01) |
| *C09J 7/20* | (2018.01) |
| *C09J 7/25* | (2018.01) |
| *C09J 7/26* | (2018.01) |

(52) U.S. Cl.
CPC . *C09J 7/26* (2018.01); *C09J 7/38* (2018.01); *C09J 7/385* (2018.01); *C09J 11/04* (2013.01); *C09J 11/08* (2013.01); *C08J 2201/026* (2013.01); *C08J 2203/22* (2013.01); *C08J 2207/02* (2013.01); *C09J 2301/204* (2020.08); *C09J 2301/412* (2020.08); *C09J 2400/143* (2013.01); *C09J 2467/006* (2013.01); *C09J 2481/006* (2013.01); *Y10T 428/14* (2015.01); *Y10T 428/28* (2015.01)

(58) Field of Classification Search
CPC .................. C09J 11/08; C09J 2301/204; C09J 2301/412; C09J 2400/143; C09J 2467/006; C09J 2481/006; C08J 9/32; C08J 2201/026; C08J 2203/22; C08J 2207/02; C08J 2381/02; C08J 2381/04; Y10T 428/14; Y10T 428/28; C08L 81/02; C08L 81/04; C08G 75/00
See application file for complete search history.

(56) References Cited

U.S. PATENT DOCUMENTS

| | | | |
|---|---|---|---|
| 5,912,319 A | 6/1999 | Zook | |
| 6,486,297 B2 | 11/2002 | Zook | |
| 2004/0097643 A1* | 5/2004 | Bons | ........................ C08L 71/02 |
| | | | 524/609 |
| 2004/0152866 A1* | 8/2004 | Cosman | .................. C08L 81/02 |
| | | | 528/373 |
| 2008/0287574 A1* | 11/2008 | Loth | ......................... C09J 11/04 |
| | | | 524/588 |
| 2016/0326413 A1* | 11/2016 | Schuh | .................... C09J 163/04 |
| 2020/0291184 A1* | 9/2020 | Morita | .................... C08G 59/66 |

FOREIGN PATENT DOCUMENTS

| | | |
|---|---|---|
| WO | WO 2001-66621 | 9/2001 |
| WO | WO 2003-054069 | 7/2003 |
| WO | WO 2006-029145 | 3/2006 |
| WO | WO 2016-130673 | 8/2016 |

OTHER PUBLICATIONS

Yukun, et al., Handbook of Pressure Sensitive Adhesive Products and Technology *Chemical Industry Press—Chemistry and Applied Chemistry Publishing Center—Beijing*,(Sep. 2004) 7 pages including translation.

Yulong, et al., "Bonding Technical Manual", *China Light Industry Press* (Aug. 2001) 8 pages including translation.

Pocius, "Adhesion and Adhesives Technology: An Introduction", Hanser Publishers, First Edition, 1997, pp. 1-7.

International Search Report for PCT International Application No. PCT/US2017/066278, dated May 7, 2018, 5 pages.

* cited by examiner

SEALANT TAPE

CROSS REFERENCE TO RELATED APPLICATIONS

This application is a national stage filing under 35 U.S.C. 371 of PCT/US2017/066278 filed Dec. 14, 2017, which claims the benefit of U.S. Provisional Patent Application No. 62/433,906, filed Dec. 14, 2016, the disclosures of which are incorporated by reference in their entirety herein.

BACKGROUND

In the aerospace industry, access panels commonly need to be sealed to hatches or to other parts, or other parts need to be sealed together (e.g., body to wing fairings), against air or liquid penetration using seals that have good high or low temperature performance as well as high chemical tolerance. The conventional practice when sealing a panel to an area is a form-in-place technique, including applying a polysulfide or polythioether sealant to the area to be sealed, applying a release coat to the panel, placing the panel on the area to the sealed, and waiting for sealant to cure. The panel is then removed, the sealant trimmed and cleaned up, and the release coat is removed from the panel. The panel is then reinstalled over the area to be sealed. The form-in-place technique is laborious and time consuming. Although various expanded adhesive tapes are available to simplify the procedure, such tapes can be extremely expensive and can allow leakage through the adhesive.

SUMMARY OF THE INVENTION

In various embodiments, the present invention provides a tape including the cured product of a sealant composition. For example, the present invention provides a tape including a cured product of a sealant composition. The sealant composition includes a curable liquid. The curable liquid includes a polysulfide, a polythioether, a copolymer thereof, or a combination thereof. The sealant composition also includes a curing agent for curing the curable liquid.

In various embodiments, the present invention provides a method of using the tape including the cured product of the sealant composition to form a seal. The method includes applying the tape to a seal area (e.g., between parts), to form a seal.

In various embodiments, the present invention provides a method of making a tape including the cured product of the sealant composition. The method includes combining adhesive and the cured product of the sealant composition, to form the tape.

In various embodiments, the present invention provides a seal including the tape that includes the cured product of the sealant composition.

In various embodiments, the present invention provides an adhesive-backed sealing tape. The cured product includes a first major surface and a second major surface opposite the first major surface. The first major surface includes an adhesive pattern including pressure-sensitive adhesive and the second major surface is substantially free of adhesive. The tape includes a) a continuous region of adhesive-free area on the tape that extends in a longitudinal direction of the tape, b) a continuous region of adhesive-free area on the tape that extends in a latitudinal direction of the tape, c) the tape is substantially free of continuous regions of adhesive extending in a latitudinal direction of the tape on the first major surface from one edge of the first major surface to an opposite edge of the first major surface, or any combination of a), b) and c).

In various embodiments, the present invention provides a kit or packaged article including the tape that includes the cured product of the sealant composition or the adhesive-backed sealing tape that is formed from any suitable composition. In some embodiments, the tape can be disposed on a release liner, on a roll, or a combination thereof In various embodiments, the present invention provides various advantages over other sealant compositions and sealant tapes, at least some of which are unexpected. For example, in some embodiments, the sealant tape of the present invention is less expensive and can be more easily manufactured than fluoropolymer tapes (e.g., PTFE tape), but can provide performance (e.g., sealing performance, hot/cold temperature performance, chemical tolerance, or a combination thereof) comparable to or better than to seals formed using the conventional form-in-place technique. In some embodiments, the tape of the present invention can be more durable than other tapes, such as compared to fluoropolymer tapes (e.g., PTFE tape). In some embodiments, the physical properties of the sealant tape of the present invention can be more easily tailored than those of other tapes, such as compared to fluoropolymer tapes (e.g., PTFE tape). In some embodiments, the sealant tape of the present invention can be less porous than other tapes, such as compared to fluoropolymer tapes (e.g., PTFE tape). In some embodiments, the sealant tape of the present invention can be more compressible than other tapes or form-in-place seals, and can be more resistant to compression set (e.g., more resistant to failure to decompress after being placed under pressure), such as compared to fluoropolymer tapes (e.g., PTFE tape). In some embodiments, the sealant tape of the present invention can be used to form a seal, such as for panels in the aerospace industry, more rapidly as compared to forming a seal using the conventional form-in-place technique. In some embodiments, the tape of the present invention can be used to form seals at similar or less expense as compared to forming a seal using the conventional form-in-place technique. In some embodiments, the tape of the present invention can provide more positive pressure against closed mating surfaces being sealed as compared to other tapes (e.g., fluoropolymer tapes such as PTFE tape), and as compared to form-in-place seals (which only provide minor amounts of positive pressure against sealed surfaces). In some embodiments, the tape of the present invention can be less dense as compared to other tapes (e.g., fluoropolymer tapes such as PTFE tape), and as compared to form-in-place seals.

In some embodiments, the sealant tape forms an improved seal with the mating surface compared to other tapes, where the adhesive on the tape of this invention includes a continuous region of adhesive-free area on the tape that extends in a longitudinal direction of the tape, in a latitudinal direction of the tape, or in both a longitudinal and a latitudinal direction of the tape, which allows the cured sealant to be in direct contact, without intervening adhesive, to the sealed surface. This direct contact is beneficial for sealing, conduction, and all aspects where it is advantageous for the tape to flatly engage both sealing surfaces.

BRIEF DESCRIPTION OF THE FIGURES

The drawings illustrate generally, by way of example, but not by way of limitation, various embodiments of the present invention.

DETAILED DESCRIPTION OF THE INVENTION

Figure 1:
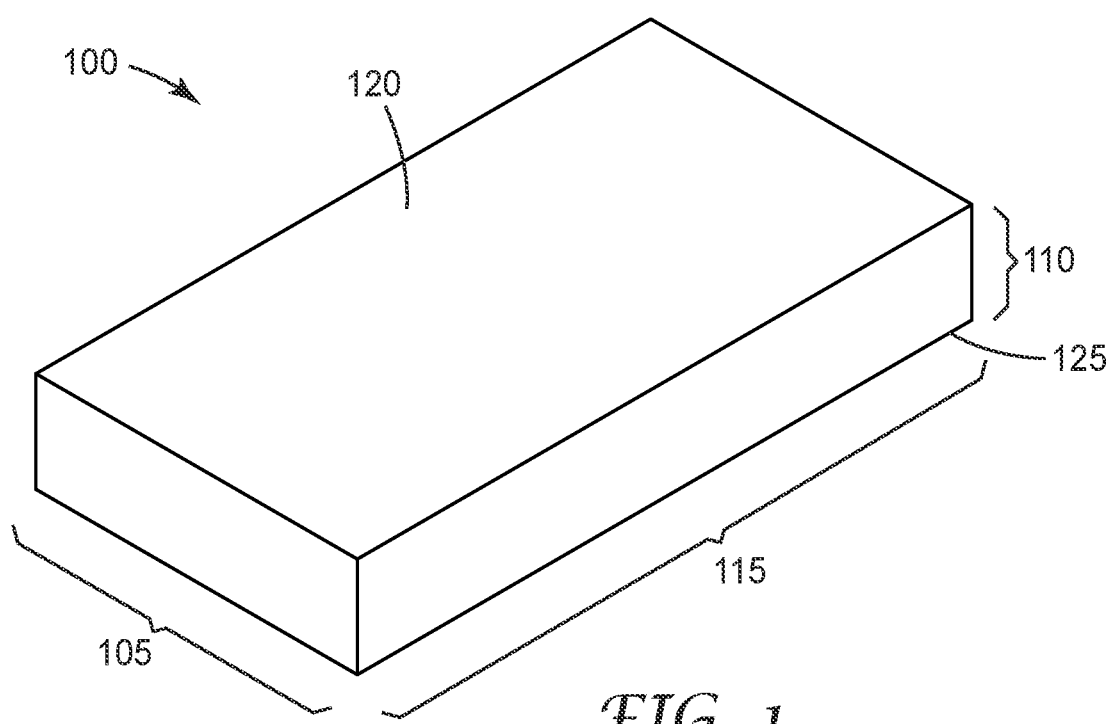
FIG. 1 illustrates a tape, according to various embodiments.

Reference will now be made in detail to certain embodiments of the disclosed subject matter. While the disclosed subject matter will be described in conjunction with the enumerated claims, it will be understood that the exemplified subject matter is not intended to limit the claims to the disclosed subject matter.

Throughout this document, values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a range of "about 0.1% to about 5%" or "about 0.1% to 5%" should be interpreted to include not just about 0.1% to about 5%, but also the individual values (e.g., 1%, 2%, 3%, and 4%) and the sub-ranges (e.g., 0.1% to 0.5%, 1.1% to 2.2%, 3.3% to 4.4%) within the indicated range. The statement "about X to Y" has the same meaning as "about X to about Y," unless indicated otherwise. Likewise, the statement "about X, Y, or about Z" has the same meaning as "about X, about Y, or about Z," unless indicated otherwise.

In this document, the terms "a," "an," or "the" are used to include one or more than one unless the context clearly dictates otherwise. The term "or" is used to refer to a nonexclusive "or" unless otherwise indicated. The statement "at least one of A and B" has the same meaning as "A, B, or A and B." In addition, it is to be understood that the phraseology or terminology employed herein, and not otherwise defined, is for the purpose of description only and not of limitation. Any use of section headings is intended to aid reading of the document and is not to be interpreted as limiting; information that is relevant to a section heading may occur within or outside of that particular section. All publications, patents, and patent documents referred to in this document are incorporated by reference herein in their entirety, as though individually incorporated by reference. In the event of inconsistent usages between this document and those documents so incorporated by reference, the usage in the incorporated reference should be considered supplementary to that of this document; for irreconcilable inconsistencies, the usage in this document controls.

In the methods described herein, the acts can be carried out in any order without departing from the principles of the invention, except when a temporal or operational sequence is explicitly recited. Furthermore, specified acts can be carried out concurrently unless explicit claim language recites that they be carried out separately. For example, a claimed act of doing X and a claimed act of doing Y can be conducted simultaneously within a single operation, and the resulting process will fall within the literal scope of the claimed process.

The term "about" as used herein can allow for a degree of variability in a value or range, for example, within 10%, within 5%, or within 1% of a stated value or of a stated limit of a range, and includes the exact stated value or range.

The term "substantially" as used herein refers to a majority of, or mostly, as in at least about 50%, 60%, 70%, 80%, 90%, 95%, 96%, 97%, 98%, 99%, 99.5%, 99.9%, 99.99%, or at least about 99.999% or more, or 100%. The term "substantially free of" can mean having a trivial amount of, such that a composition is about 0 wt % to about 5 wt % of the material, or about 0 wt % to about 1 wt %, or about 5 wt % or less, or less than, equal to, or greater than about 4.5 wt %, 4, 3.5, 3, 2.5, 2, 1.5, 1, 0.9, 0.8, 0.7, 0.6, 0.5, 0.4, 0.3, 0.2, 0.1, 0.01, or about 0.001 wt % or less, or about 0 wt %.

The term "organic group" as used herein refers to any carbon-containing functional group. Examples can include an oxygen-containing group such as an alkoxy group, aryloxy group, aralkyloxy group, oxo(carbonyl) group; a carboxyl group including a carboxylic acid, carboxylate, and a carboxylate ester; a sulfur-containing group such as an alkyl and aryl sulfide group; and other heteroatom-containing groups. Non-limiting examples of organic groups include OR, OOR, OC(O)N(R)$_2$, CN, CF$_3$, OCF$_3$, R, C(O), methylenedioxy, ethylenedioxy, N(R)$_2$, SR, SOR, SO$_2$R, SO$_2$N(R)$_2$, SO$_3$R, C(O)R, C(O)C(O)R, C(O)CH$_2$C(O)R, C(S)R, C(O)OR, OC(O)R, C(O)N(R)$_2$, OC(O)N(R)$_2$, C(S)N(R)$_2$, (CH$_2$)$_{0-2}$N(R)C(O)R, (CH$_2$)$_{0-2}$N(R)N(R)$_2$, N(R)N(R)C(O)R, N(R)N(R)C(O)OR, N(R)N(R)CON(R)$_2$, N(R)SO$_2$R, N(R)SO$_2$N(R)$_2$, N(R)C(O)OR, N(R) C(O)R, N(R)C(S)R, N(R)C(O)N(R)$_2$, N(R)C(S)N(R)$_2$, N(COR)COR, N(OR)R, C(=NH)N(R)$_2$, C(O)N(OR)R, C(=NOR)R, and substituted or unsubstituted (C$_1$-C$_{100}$)hydrocarbyl, wherein R can be hydrogen (in examples that include other carbon atoms) or a carbon-based moiety, and wherein the carbon-based moiety can be substituted or unsubstituted.

The term "substituted" as used herein in conjunction with a molecule or an organic group as defined herein refers to the state in which one or more hydrogen atoms contained therein are replaced by one or more non-hydrogen atoms. The term "functional group" or "substituent" as used herein refers to a group that can be or is substituted onto a molecule or onto an organic group. Examples of substituents or functional groups include, but are not limited to, a halogen (e.g., F, Cl, Br, and I); an oxygen atom in groups such as hydroxy groups, alkoxy groups, aryloxy groups, aralkyloxy groups, oxo(carbonyl) groups, carboxyl groups including carboxylic acids, carboxylates, and carboxylate esters; a sulfur atom in groups such as thiol groups, alkyl and aryl sulfide groups, sulfoxide groups, sulfone groups, sulfonyl groups, and sulfonamide groups; a nitrogen atom in groups such as amines, hydroxyamines, nitriles, nitro groups, N-oxides, hydrazides, azides, and enamines; and other heteroatoms in various other groups. Non-limiting examples of substituents that can be bonded to a substituted carbon (or other) atom include F, Cl, Br, I, OR, OC(O)N(R)$_2$, CN, NO, NO$_2$, ONO$_2$, azido, CF$_3$, OCF$_3$, R, O (oxo), S (thiono), C(O), S(O), methylenedioxy, ethylenedioxy, N(R)$_2$, SR, SOR, SO$_2$R, SO$_2$N(R)$_2$, SO$_3$R, C(O)R, C(O)C(O)R, C(O)CH$_2$C(O)R, C(S)R, C(O)OR, OC(O)R, C(O)N(R)$_2$, OC(O)N(R)$_2$, C(S)N(R)$_2$, (CH$_2$)$_{0-2}$N(R)C(O)R, (CH$_2$)$_{0-2}$N(R)N(R)$_2$, N(R)N(R)C(O)R, N(R)N(R)C(O)OR, N(R)N(R)CON(R)$_2$, N(R)SO$_2$R, N(R)SO$_2$N(R)$_2$, N(R)C(O)OR, N(R)C(O)R, N(R)C(S)R, N(R)C(O)N(R)$_2$, N(R)C(S)N(R)$_2$, N(COR)COR, N(OR)R, C(=NH)N(R)$_2$, C(O)N(OR)R, and C(=NOR)R, wherein R can be hydrogen or a carbon-based moiety; for example, R can be hydrogen, $(C_1-C_{100})$hydrocarbyl, alkyl, acyl, cycloalkyl, aryl, aralkyl, heterocyclyl, heteroaryl, or heteroarylalkyl; or wherein two R groups bonded to a nitrogen atom or to adjacent nitrogen atoms can together with the nitrogen atom or atoms form a heterocyclyl.

The term "alkyl" as used herein refers to straight chain and branched alkyl groups and cycloalkyl groups having from 1 to 40 carbon atoms, 1 to about 20 carbon atoms, 1 to 12 carbons or, in some embodiments, from 1 to 8 carbon atoms. Examples of straight chain alkyl groups include those with from 1 to 8 carbon atoms such as methyl, ethyl, n-propyl, n-butyl, n-pentyl, n-hexyl, n-heptyl, and n-octyl groups. Examples of branched alkyl groups include, but are not limited to, isopropyl, iso-butyl, sec-butyl, t-butyl, neopentyl, isopentyl, and 2,2-dimethylpropyl groups. As used herein, the term "alkyl" encompasses n-alkyl, isoalkyl, and anteisoalkyl groups as well as other branched chain forms of alkyl. Representative substituted alkyl groups can be substituted one or more times with any of the groups listed herein, for example, amino, hydroxy, cyano, carboxy, nitro, thio, alkoxy, and halogen groups.

The terms "halo," "halogen," or "halide" group, as used herein, by themselves or as part of another substituent, mean, unless otherwise stated, a fluorine, chlorine, bromine, or iodine atom.

The term "hydrocarbon" or "hydrocarbyl" as used herein refers to a molecule or functional group that includes carbon and hydrogen atoms. The term can also refer to a molecule or functional group that normally includes both carbon and hydrogen atoms but wherein all the hydrogen atoms are substituted with other functional groups.

As used herein, the term "hydrocarbyl" refers to a functional group derived from a straight chain, branched, or cyclic hydrocarbon, and can be alkyl, alkenyl, alkynyl, aryl, cycloalkyl, acyl, or any combination thereof. Hydrocarbyl groups can be shown as $(C_a-C_b)$hydrocarbyl, wherein a and b are integers and mean having any of a to b number of carbon atoms. For example, $(C_1-C_4)$hydrocarbyl means the hydrocarbyl group can be methyl $(C_1)$, ethyl $(C_2)$, propyl $(C_3)$, or butyl $(C_4)$, and $(C_0-C_b)$hydrocarbyl means in certain embodiments there is no hydrocarbyl group.

The term "cure" as used herein refers to chemically crosslinking, such as by exposing to radiation in any form, heating, or allowing to undergo a chemical reaction that results in hardening or an increase in viscosity (e.g., under room temperature or heated conditions). A thermoset material can be cured by heating or otherwise exposing to irradiation such that the material hardens.

The term "solvent" as used herein refers to a liquid that can dissolve a solid, liquid, or gas. Non-limiting examples of solvents are silicones, organic compounds, water, alcohols, ionic liquids, and supercritical fluids.

The term "room temperature" as used herein refers to a temperature of about 15° C. to 28° C.

As used herein, the term "polymer" refers to a molecule having at least one repeating unit and can include copolymers.

Sealant Composition.

In various embodiments, the present invention provides a sealant composition. The sealant composition is a curable composition, the cured product of which can form a seal. The sealant composition includes a curable liquid that includes or is a polysulfide, a polythioether, a copolymer thereof, or a combination thereof. The sealant composition also includes a curing agent for curing the curable liquid.

The sealant composition can be in any suitable physical form. In some embodiments, the sealant composition is a caulk. The sealant composition can be in a form suitable to form a flat strip of material curable to form a tape, such as in an extrudable form.

The curable liquid can be any suitable proportion of the sealant composition, such as about 50 wt % to about 99.9 wt % of the sealant composition, about 80 wt % to about 98 wt %, about 85 wt % to about 95 wt %, or about 50 wt % or less, or less than, equal to, or greater than about 55 wt %, 60, 65, 70, 75, 80, 82, 84, 85, 86, 87, 88, 89, 90, 91, 92, 93, 94, 95, 96, 97, 98, 99, 99.9 wt %, or about 99.99 wt % or more of the sealant composition.

Examples of polysulfides, polythioethers, and copolymers thereof include polymers including repeating units that include a sulfide (e.g., —S—S—) or a thioether (e.g., -thio$(C_1-C_5)$alkylene)-) moiety therein, and including pendant or terminal mercaptan (i.e., —SH) groups. Examples of polysulfides can include those described in U.S. Pat. No. 2,466,963, such as polymers formed by condensing bis(2-chloroethoxy)methane with sodium disulfide or sodium polysulfide. Examples of polythioethers include polymers formed via condensation reaction of, for example, 2-hydroxyalkyl sulfide monomers such as those described in U.S. Pat. No. 4,366,307 and those formed via addition reactions of dithiols and divinylethers such as those described in U.S. Pat. No. 6,486,297. Examples of polythioethers include those described in U.S. Pat. No. 5,912,319, and those described in PCT Publication No. WO 2016/130673, such as polymers formed via reaction of polythiols with certain dienes. The polysulfide, polythioether, or copolymer thereof can have any suitable molecular weight, such as a number-average molecular weight of about 500 g/mol to about 5,000 g/mol, or about 500 g/mol to about 1,500 g/mol, or about 500 g/mol or less, or less than, equal to, or greater than about 600 g/mol, 700, 800, 900, 1,000, 1,100, 1,200, 1,300, 1,400, 1,500, 1,600, 1,800, 2,000, 2,250, 2,500, 2,750, 3,000, 3,500, 4,000, 4,500, or about 5,000 g/mol or more. The polysulfide, polythioether, or copolymer thereof can have any suitable mercaptan content based on the overall weight of the liquid polysulfide, such as about 0.1 wt % to about 20 wt %, about 1 wt % to about 10 wt %, about 1 wt % to about 6 wt %, or about 1 wt % to about 3 wt %, or about 0.1 wt % or less, or less than, equal to, or greater than about 0.5 wt %, 1, 3, 4, 5, 6, 7, 8, 9, 10, 12, 14, 16, 18, or about 20 wt % or more. Any suitable proportion of the curable liquid can be the polysulfide, polythioether, copolymer thereof, or combination thereof, such as about 50 wt % to about 100 wt %, or about 90 wt % to about 100 wt %, or 50 wt % or less, or less than, equal to, or greater than about 55 wt %, 60, 65, 70, 75, 80, 85, 90, 91, 92, 93, 94, 95, 96, 97, 98, 99, 99.9 wt %, or about 99.99 wt % or more.

The curing agent can include one or more components that react with pendant or terminal thiol groups on the polysulfide or polythioether, such as a crosslinking agent. The curing agent can include epoxy resins (e.g., a diepoxide or polyepoxide), such as hydantoin diepoxide, diglycidyl ether of bisphenol-A epoxides, diglycidyl ether of bisphenol-F epoxides, Novolak type epoxides, and any suitable epoxidized unsaturated and phenolic resins. The curing agent can include unsaturated compounds such as acrylic or methacrylic esters of commercially available polyols, unsaturated synthetic or naturally occurring resin compounds, triallylcyanurate (TAC), and olefinically-terminated derivatives of the polysulfides, polythioethers, or copolymers thereof, described herein. The curing agent can include organic and inorganic peroxides (e.g., $MnO_2$), which can oxidative couple the thiol groups of the curable liquid. In some embodiments, the curing agent includes a blue light-activated curing agent that reacts with pendant or terminal thiol groups on the polysulfide or polythioether upon exposure to blue light. The curing agent can form any suitable proportion of the sealant composition, such as about 0.1 wt % to about 20 wt % of the sealant composition, about 1 wt % to about 10 wt %, about 3 wt % to about 10 wt %, about 5.5 wt % to about 6 wt %, or about 0.1 wt % or less, or less than, equal to, or greater than about 0.5 wt %, 1, 2, 3, 4, 5, 5.2, 5.4, 5.5, 5.6, 5.7, 5.8, 5.9, 6, 6.2, 6.4, 6.8, 7, 8, 9 wt %, or about 10 wt % or more of the sealant composition.

The sealant composition can further include one or more fillers. The one or more fillers can form any suitable proportion of the sealant composition, such as about 0.001 wt % to about 70 wt % of the sealant composition, 0.001 wt % to about 40 wt %, about 0.1 wt % to about 20 wt %, about 1 wt % to about 10 wt %, or about 0.001 wt % or less, or less than, equal to, or greater than about 0.01 wt %, 0.1, 1, 2, 3, 4, 5, 6, 7, 8, 9, 10, 12, 14, 16, 18 wt %, or about 20 wt % or more of the sealant composition. The filler can be any suitable filler. Each of the one or more fillers can independently include or be a conductive filler, polymer bubbles, foam, corrugated filler, waffled filler, organic fibers (e.g., polyimide fibers, polyamide fibers, or polyethylene fibers), inorganic fibers (e.g., carbon or graphite fibers, glass fibers, ceramic fibers, boron fibers, silicon carbide fibers), a silica, a silicate, a boron powder, a metal oxide, calcium sulfate, calcium carbonate, glass, kaolin, a metal, a metal alloy, a barium compound, a flaked filler, a natural filler, a polymeric filler, an anti-static agent, or a combination thereof. Each of the one or more fillers can independently be fibrous or particulate. Each of the one or more fillers can be independently chosen from glass fibers, aluminum silicate (mullite), synthetic calcium silicate, zirconium silicate, fused silica, crystalline silica graphite, natural silica sand, or the like; boron powders such as boron-nitride powder, boron-silicate powders, or the like; oxides such as $TiO_2$, aluminum oxide, magnesium oxide, zinc oxide, or the like; calcium sulfate (as its anhydride, dehydrate or trihydrate); calcium carbonates such as chalk, limestone, marble, synthetic precipitated calcium carbonates, or the like; talc, including fibrous, modular, needle shaped, lamellar talc, or the like; wollastonite; surface-treated wollastonite; glass spheres such as hollow and solid glass spheres, silicate spheres, cenospheres, aluminosilicate (armospheres), or the like; kaolin, including hard kaolin, soft kaolin, calcined kaolin, kaolin including various coatings known in the art to facilitate compatibility with the polymeric matrix resin, or the like; single crystal fibers or "whiskers" such as silicon carbide, alumina, boron carbide, iron, nickel, copper, or the like; fibers (including continuous and chopped fibers) such as asbestos, carbon fibers; sulfides such as molybdenum sulfide, zinc sulfide, or the like; barium compounds such as barium titanate, barium ferrite, barium sulfate, heavy spar, or the like; metals (e.g., metal mesh, metal plate) and metal oxides such as particulate or fibrous aluminum, bronze, zinc, copper and nickel, or the like; flaked fillers such as glass flakes, flaked silicon carbide, aluminum diboride, aluminum flakes, steel flakes or the like; fibrous fillers, for example short inorganic fibers such as those derived from blends including at least one of aluminum silicates, aluminum oxides, magnesium oxides, and calcium sulfate hemihydrate or the like; natural fillers and reinforcements, such as wood flour obtained by pulverizing wood, fibrous products such as kenaf, cellulose, cotton, sisal, jute, flax, starch, corn flour, lignin, ramie, rattan, agave, bamboo, hemp, ground nut shells, corn, coconut (coir), rice grain husks or the like; organic fillers such as polytetrafluoroethylene, reinforcing organic fibrous fillers formed from organic polymers capable of forming fibers such as poly(ether ketone), polyimide, polybenzoxazole, poly(phenylene sulfide), polyesters, polyethylene, aromatic polyamides, aromatic polyimides, polyetherimides, polytetrafluoroethylene, acrylic resins, poly(vinyl alcohol) or the like; as well as fillers such as mica, clay, feldspar, flue dust, fillite, quartz, quartzite, perlite, Tripoli, diatomaceous earth, carbon black, or the like, and combinations including at least one of the foregoing fillers. Fillers can be coated with a layer of metallic material to facilitate conductivity, or surface treated with silanes, siloxanes, or a combination of silanes and siloxanes to improved adhesion and dispersion with the resin. Fillers can be carbon fibers, glass beads, glass flakes, glass fibers, glass bubbles, or a combination thereof. Fillers can be glass fibers (e.g., soda-lime glass, fused silica glass, borosilicate glass, lead-oxide glass, aluminosilicate glass, oxide glass, glass with high zirconia content, or a combination thereof).

The one or more fillers can have any suitable void space (e.g., the volume percent of the filler that is hollow), such as about 0% to about 98%, about 50% to about 98%, about 25% to about 96%, 25% to about 75%, about 95% to about 98%, or about 0%, or less than, equal to, or greater than 5%, 10, 15, 20, 25, 30, 35, 40, 45, 50, 52, 54, 56, 58, 60, 62, 64, 66, 68, 70, 72, 74, 76, 78, 80, 82, 84, 86, 88, 90, 92, 94, 96, 97%, or about 98% or more. One or more of the fillers can be selected to have a void space of greater than zero to impart void space to the cured product of the sealant composition, which can provide sponginess and compressibility to the cured product, allowing it to for example mold to contours of an area to be sealed and of a panel designed to be sealed to the area. For example, the one or more fillers can be chosen from a foam, polymer bubbles, foam, corrugated filler, waffled filler, and a combination thereof.

The one or more fillers can include polymer bubbles. The polymer bubbles can have any suitable shape, such as a spherical shape. The polymer bubbles can have any suitable particle size (e.g., largest dimension of the bubble), such as a mean particle size, such as about 1 micron to about 1 mm, about 10 microns to about 300 microns, about 50 microns to about 150 microns, about 80 to about 120 microns, or about 1 micron or less, or less than, equal to, or greater than about 2 microns, 3, 4, 5, 10, 15, 20, 25, 30, 35, 40, 45, 50, 52, 54, 56, 58, 60, 62, 64, 66, 68, 70, 72, 74, 76, 78, 80, 82, 84, 86, 88, 90, 92, 94, 96, 98, 100, 102, 104, 106, 108, 110, 112, 114, 116, 118, 120, 122, 124, 126, 128, 130, 132, 134, 136, 138, 140, 142, 144, 146, 148, 150, 155, 160, 165, 170, 175, 180, 185, 190, 195, 200, 225, 250, 275, 300, 350, 400, 450, 500, 600, 700, 800, 900 microns, or about 1 mm or more. The polymer bubbles can have any suitable void space, such as about 10% to about 98%, about 25% to about 96%, about 25% to about 75%, or less than about 10%, or less than, equal to, or greater than 12%, 14, 16, 18, 20, 25, 26, 28, 30, 32, 34, 36, 38, 40, 42, 44, 46, 48, 50, 52, 54, 56, 58, 60, 62, 64, 66, 68, 70, 72, 74, 76, 78, 80, 82, 84, 86, 88, 90, 92, 94, 96, 97%, or about 98% or more.

The polymer bubbles can include a gaseous interior (e.g., air, or any suitable gas, such as an inert gas like nitrogen or argon). The polymer bubbles can include a polymer shell, which can be formed from any one or more suitable polymers, such as independently selected from acrylonitrile butadiene styrene (ABS) polymer, an acrylic polymer, a celluloid polymer, a cellulose acetate polymer, a cycloolefin copolymer (COC), an ethylene-vinyl acetate (EVA) polymer, an ethylene vinyl alcohol (EVOH) polymer, a fluoroplastic, an ionomer, an acrylic/PVC alloy, a liquid crystal polymer (LCP), a polyacetal polymer (POM or acetal), a polyacrylate polymer, a polymethylmethacrylate polymer (PMMA), a polyacrylonitrile polymer (PAN or acrylonitrile), a polyamide polymer (PA, such as nylon), a polyamide-imide polymer (PAI), a polyaryletherketone polymer (PAEK), a polybutadiene polymer (PBD), a polybutylene polymer (PB), a polybutylene terephthalate polymer (PBT), a polycaprolactone polymer (PCL), a polychlorotrifluoroethylene polymer (PCTFE), a fluoropolymer, a polytetrafluoroethylene polymer (PTFE), a polyethylene terephthalate polymer (PET), a polycyclohexylene dimethylene terephthalate polymer (PCT), a poly(cyclohexylenedimethylene terephthalate-co-ethylene glycol) (PCTG), a Tritan™ copolyester, a polycarbonate polymer (PC), poly(1,4-cyclohexylidene cyclohexane-1,4-dicarboxylate) (PCCD), a polyhydroxyalkanoate polymer (PHA), a polyketone polymer (PK), a polyester polymer, a polyethylene polymer (PE), a polyetheretherketone polymer (PEEK), a polyetherketoneketone polymer (PEKK), a polyetherketone polymer (PEK), a polyetherimide polymer (PEI), a polyethersulfone polymer (PES), a polyethylenechlorinate polymer (PEC), a polyimide polymer (PI), a polylactic acid polymer (PLA), a polymethylpentene polymer (PMP), a polyphenylene oxide polymer (PPO), a polyphenylene sulfide polymer (PPS), a polyphthalamide polymer (PPA), a polypropylene polymer, a polystyrene polymer (PS), a polysulfone polymer (PSU), a polytrimethylene terephthalate polymer (PTT), a polyurethane polymer (PU), a polyvinyl acetate polymer (PVA), a polyvinyl chloride polymer (PVC), a polyvinylidene chloride polymer (PVDC), a polyamideimide polymer (PAI), a polyarylate polymer, a polyoxymethylene polymer (POM), a styrene-acrylonitrile polymer (SAN), and a combination thereof. The polymer shell can include a polymer formed from one or more independently selected substituted or unsubstituted ethylenically-unsaturated ($C_1$-$C_{50}$)hydrocarbons. For example, the polymer shell can include poly(acrylonitrile-co-vinylidene chloride-co-methyl methacrylate).

The sealant composition, or the components thereof, can optionally include or be substantially free of any suitable component, such as a gas (e.g., air), a blowing agent, water, saline, a base, an acid, oil, an organic solvent, an alcohol or polyol, cellulose, starch, an alkalinity control agents, an acidity control agent, a density control agent, a density modifier, an emulsifier, a dispersant, an antioxidant, a heat stabilizer, a corrosion-inhibitor (e.g., chromatid or nonchromatid), a foam control agent, a diluent, a plasticizer, a pigment, a dye, a surfactant, a salt, a rheology modifier, a curing accelerator, a curing retarder, a pH modifier, a chelating agent, an oxidizer, an adhesion promoter, a filler, or a combination thereof. Any one or more of the components in this paragraph can form any suitable proportion of the sealant composition, the curable liquid, the curing agent, or any other component of the sealant composition, such as about 0 wt %, or about 0.001 wt % to about 50 wt %, or about 0.1 wt % to about 5 wt %, or about 0.001 wt % or less, or less than, equal to, or greater than about 0.001 wt %, 0.01, 0.1, 1, 2, 3, 4, 5, 6, 8, 10, 12, 14, 16, 18, 20, 25, 30, 35, 40, 45, or about 50 wt % or more.

Cured Product of the Sealant Composition and Seal Including the Same.

In various embodiments, the present invention provides a cured product of the sealant composition, such as including a cured product of any suitable sealant composition described herein. For example, the cured product can be a cured product of a sealant composition including a curable liquid that includes or is a polysulfide, a polythioether, a copolymer thereof, or a combination thereof. The sealant composition also includes a curing agent for curing the curable liquid.

The cured product can include void space therein (e.g., hollow areas in the cured product). The void space can be distributed in any suitable way, such as homogeneously distributed. The void space can impact compressibility or sponginess to the cured product, which can allow the cured product to function effectively as a seal. The cured product can have any suitable amount of void space, such as about 0% to about 99%, about 5% to about 90%, about 25% to about 96%, about 25% to about 75%, or about 0% or less, or less than, equal to, or greater than about 1%, 2, 3, 4, 5, 6, 8, 10, 12, 14, 16, 18, 20, 25, 30, 35, 40, 45, 50, 55, 60, 65, 70, 75, 80, 82, 84, 86, 88, 90, 91, 92, 93, 94, 95, 96, 97, 98%, or about 99% or more.

The cured product can have any suitable density consistent with the sealant compositions described herein. For example, the cured product can have a density of about 0.1 $g/cm^3$ to about 3 $g/cm^3$, about 0.5 $g/cm^3$ to about 1.2 $g/cm^3$, about 0.5 $g/cm^3$ to about 1.4 $g/cm^3$, or about 0.1 $g/cm^3$ or less, or less than, equal to, or greater than about 0.2 $g/cm^3$, 0.4, 0.5, 0.6, 0.7, 0.8, 0.9, 1, 1.1, 1.2, 1.3, 1.4, 1.5, 1.6, 1.8, 2, 2.2, 2.4, 2.6, 2.8 $g/cm^3$, or about 3 $g/cm^3$ or more.

The cured product can have any suitable compression under a particular pressure as consistent with the sealant compositions described herein. For example, the cured product can have a compression at about 7.6 MPa of about 0% to about 98%, about 20% to about 98%, about 60% to about 95%, or about 20% or less, or less than, equal to, or greater than about 25%, 30, 35, 40, 45, 50, 55, 60, 62, 64, 66, 68, 70, 72, 74, 76, 78, 80, 82, 84, 86, 88%, 90, 92, 94, 96, 97%, or about 98% or more.

In various embodiments, the present invention provides a seal including a cured product of the sealant composition, such as including a cured product of any suitable sealant composition described herein. The seal can be any suitable seal. The seal can be a gasket. The seal can be an aerospace seal (e.g., on an aerospace vehicle, such as a commercial or military aircraft). The seal can be a pre-shaped seal for sealing a particular pair of components together.

In various embodiments, the present invention provides a method of making a cured product. The method can be any suitable method of making a cured product from an embodiment of the sealant composition described herein. The method can include curing the sealant composition, to form the cured product. The curing can take place in any suitable way, such as including subjecting the sealant composition to mixing, heat, irradiation, light, or a combination thereof.

Tape.

In various embodiments, the present invention provides a tape. The tape can be any suitable tape that is formed from any suitable material. The tape can include a cured product of a curable composition (e.g., fully cured, or substantially fully cured) or can include any other suitable material such as a thermoplastic material or another material. The cured product can be a cured product of an embodiment of the sealant composition described herein, or such as a cured product of any suitable curable composition. For example, the tape can include a cured product of a sealant composition including a curable liquid that includes or is a polysulfide, a polythioether, a copolymer thereof, or a combination thereof. The sealant composition can also include a curing agent for curing the curable liquid. The major surfaces (e.g., first and second major opposing surfaces) of the tape can be approximately flat, one or more of the major surfaces of the tape can be structured (e.g., for compression enhancement), the tape can be structured throughout the thickness thereof, or a combination thereof. In some embodiments, the tape can have a waffled or corrugated shape.

In some embodiments, the present invention provides a tape that is formed from any suitable material and that includes a patterned adhesive thereon, as described herein. The tape can include any suitable material, such as a cured product of an embodiment of the sealant composition described herein, a thermoplastic material, or another one or more materials such as, for example, cork, rubber, acrylonitrile butadiene styrene (ABS) polymer, an acrylic polymer, a celluloid polymer, a cellulose acetate polymer, a cycloolefin copolymer (COC), an ethylene-vinyl acetate (EVA) polymer, an ethylene vinyl alcohol (EVOH) polymer, a fluoroplastic, an ionomer, an acrylic/PVC alloy, a liquid crystal polymer (LCP), a polyacetal polymer (POM or acetal), a polyacrylate polymer, a polymethylmethacrylate polymer (PMMA), a polyacrylonitrile polymer (PAN or acrylonitrile), a polyamide polymer (PA, such as nylon), a polyamide-imide polymer (PAI), a polyaryletherketone polymer (PAEK), a polybutadiene polymer (PBD), a polybutylene polymer (PB), a polybutylene terephthalate polymer (PBT), a polycaprolactone polymer (PCL), a polychlorotrifluoroethylene polymer (PCTFE), a fluoropolymer, a polytetrafluoroethylene polymer (PTFE, such as expanded PTFE), a polyethylene terephthalate polymer (PET), a polycyclohexylene dimethylene terephthalate polymer (PCT), a poly(cyclohexylenedimethylene terephthalate-co-ethylene glycol) (PCTG), a Tritan™ copolyester, a polycarbonate polymer (PC), poly(1,4-cyclohexylidene cyclohexane-1,4-dicarboxylate) (PCCD), a polyhydroxyalkanoate polymer (PHA), a polyketone polymer (PK), a polyester polymer, a polyethylene polymer (PE), a polyetheretherketone polymer (PEEK), a polyetherketoneketone polymer (PEKK), a polyetherketone polymer (PEK), a polyetherimide polymer (PEI), a polyethersulfone polymer (PES), a polyethylenechlorinate polymer (PEC), a polyimide polymer (PI), a polylactic acid polymer (PLA), a polymethylpentene polymer (PMP), a polyphenylene oxide polymer (PPO), a polyphenylene sulfide polymer (PPS), a polyphthalamide polymer (PPA), a polypropylene polymer, a polystyrene polymer (PS), a polysulfone polymer (PSU), a polytrimethylene terephthalate polymer (PTT), a polyurethane polymer (PU), a polyvinyl acetate polymer (PVA), a polyvinyl chloride polymer (PVC), a polyvinylidene chloride polymer (PVDC), a polyamideimide polymer (PAI), a polyarylate polymer, a polyoxymethylene polymer (POM), a styrene-acrylonitrile polymer (SAN), and a combination thereof.

The tape can further include any one or more fillers, or any other component described herein as suitable for including in the sealant composition. The one or more fillers can form any suitable proportion of the tape, such as about 0.001 wt % to about 70 wt % of the tape, 0.001 wt % to about 40 wt %, about 0.1 wt % to about 20 wt %, about 1 wt % to about 10 wt %, or about 0.001 wt % or less, or less than, equal to, or greater than about 0.01 wt %, 0.1, 1, 2, 3, 4, 5, 6, 7, 8, 9, 10, 12, 14, 16, 18 wt %, or about 20 wt % or more of the tape. The tape can include a filler that is polymer bubbles.

The tape can have any suitable dimensions. The tape can be a flat strip. The tape can be a noodle having any suitable shape. The tape can be a sheet including interior voids (e.g., such as a gasket or an o-ring). The tape can have any suitable width, such as about 1 mm to about 1500 mm, about 10 mm to about 100 mm, or less than about 1 mm, or less than, equal to, or greater than about 2 mm, 4, 6, 8, 10, 15, 20, 25, 30, 35, 40, 45, 50, 55, 60, 65, 70, 75, 80, 85, 90, 95, 100, 110, 120, 130, 140, 150, 160, 180, 200, 225, 250, 275, 300, 350, 400, 450, 500, 600, 700, 800, 900, 1,000, 1,250 mm, or about 1500 mm or more. The tape can have any suitable thickness, such as about 0.01 mm to about 30 mm, 0.1 mm to about 10 mm, or about 0.01 mm or less, or less than, equal to, or greater than about 0.05 mm, 0.1, 0.5, 1, 1.5, 2, 2.5, 3, 3.5, 4, 4.5, 5, 5.5, 6, 6.5, 7, 7.5, 8, 8.5, 9, 9.5, 10, 11, 12, 13, 14, 15, 16, 18, 20, 22, 24, 26, 28, or about 30 mm or more. The length of the tape can be any suitable length, such as at least about 0.01, about 0.1 m, or about 0.01 m to about 10,000,000 m.

The tape can include a first major surface and a second major surface opposite the first major surface (e.g., the top and bottom surface of the tape). For example, FIG. 1 illustrates an exemplary embodiment of a tape, 100. The tape 100 includes width 105, height (thickness) 110, and length 115. The tape includes first major surface 120 and second major surface opposite thereto 125. The first major surface 120 and second major surface opposite thereto 125 may share substantially parallel normal vectors at substantially all locations, or the normal vectors may be non-parallel at all or some locations.

The tape can be an adhesive tape, having adhesive thereon on one or more major surfaces thereof, wherein the major surfaces of the tape are the largest surfaces thereof (e.g., the top and bottom surfaces of the tape, and not the sides of the tape corresponding to the thickness of the tape). The first major surface, the second major surface, or both the first and second major surface can include adhesive. The first major surface, the second major surface, or both the first and second major surfaces, can be substantially free of adhesive. In some embodiments, the first major surface includes adhesive, and the second major surface is substantially free of adhesive. The adhesive can form an adhesive pattern on the tape, such as on the first major surface of the tape. Any suitable proportion of the surface area of the first major surface can be occupied with adhesive, such as about 0% to about 100%, or about 0.1 to about 49%, or about 0.1% or less, or less than, equal to, or greater than about 1%, 2, 4, 5, 10, 15, 20, 25, 30, 35, 40, 45, 50, 55, 60, 65, 70, 75, 80, 85, 90, 95, 96, 97, 98, 99, 99.9%, or about 99.99% or more.

In some embodiments, the first major surface includes adhesive, the second major surface is substantially free of adhesive, and the second surface includes a tackiness-decreasing material (e.g., an abrasion-resistant material, a friction-reducing material, or a combination thereof). The tackiness-decreasing material can help to prevent movement and flexing of the seal when the mated sealed components shift, or can help to reduce abrasion of the seal. The tackiness-decreasing material can be homogeneously distributed on the second major surface, such as in the form of a continuous or discontinuous layer. The tackiness-decreasing material can include a dust (e.g., talc), polytetrafluoroethylene (PTFE), polyethylene terephthalate (PET), polyether ether ketone (PEEK), polyether ketone (PEK), perfluoroalkoxy (PFA), copolymers of hexafluoropropylene, tetrafluoroethylene and ethylene (HTE), tetrafluoroethylene hexafluoropropylene vinylidene fluoride copolymer (THV), polyvinylidene difluoride (PVDF), a copolymer thereof, or a combination thereof.

Figure 2:
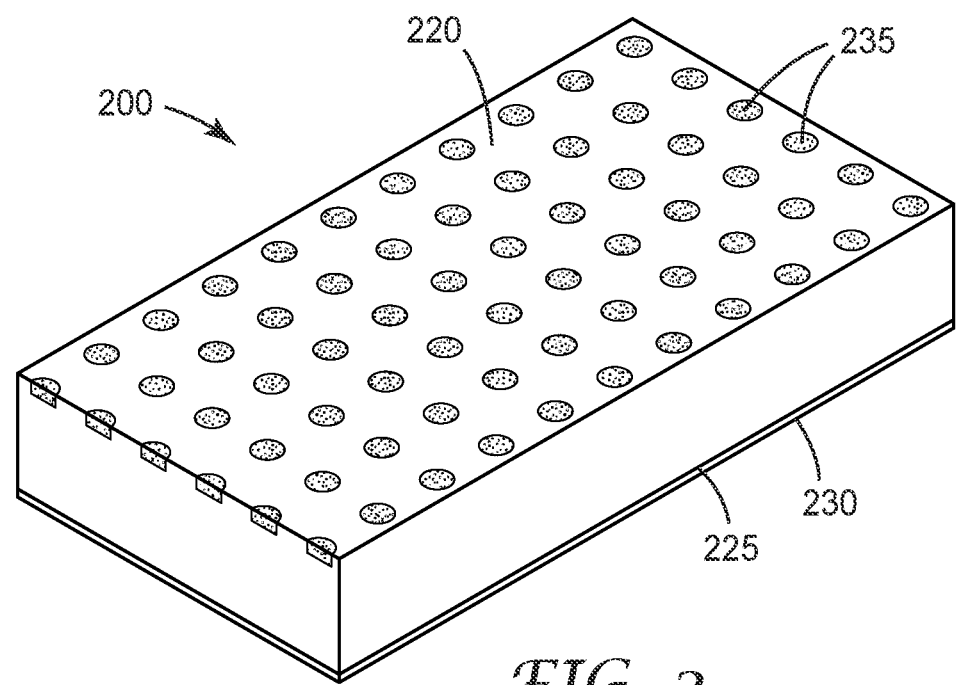
FIG. 2 illustrates a tape, according to various embodiments.

FIG. 2 illustrates an exemplary embodiment of the tape, 200. The tape 200 includes first major surface 220 and second major surface 225. The second major surface 225 includes an optional layer of tackiness-decreasing material, 230. The second major surface 225 is substantially free of adhesive. The first major surface includes adhesive 235. Adhesive 235 formed an adhesive pattern on the tape 200.

The adhesive on the tape can be any suitable adhesive. The adhesive can be a curable adhesive. The adhesive can be a pressure-sensitive adhesive. The pressure-sensitive adhesive is not particularly restricted and can include any suitable pressure-sensitive adhesive. Pressure-sensitive adhesives are a distinct category of adhesives, which in dry (solvent-free) form are aggressively, and permanently, tacky at room temperature. They firmly adhere to a variety of dissimilar surfaces upon mere contact without the need of more than finger or hand pressure. Pressure-sensitive adhesives require no activation by water, solvent, or heat to exert a strong adhesive holding force toward such materials as paper, cellophane, glass, wood, primers, and metals. Pressure-sensitive adhesives can be quantitatively described using the "Dahlquist criteria" which maintains that the elastic modulus of these materials is less than $10^6$ dynes/cm$^2$ at room temperature (see, for example, Pocius, A. V., Adhesion & Adhesives: An Introduction, Hanser Publishers, New York, N.Y., First Edition, 1997).

The pressure sensitive adhesive can include acrylic pressure-sensitive adhesives, rubber pressure-sensitive adhesives, rubber-resin pressure-sensitive adhesives, vinyl alkyl ether pressure-sensitive adhesives, silicone pressure-sensitive adhesives, polyester pressure-sensitive adhesives, polyamide pressure-sensitive adhesives, urethane pressure-sensitive adhesives, fluorinated pressure-sensitive adhesives, epoxy pressure-sensitive adhesives, block copolymer-based pressure-sensitive adhesives and other known pressure-sensitive adhesives. Each of the different pressure-sensitive adhesives can be used alone or in combination. The particular pressure-sensitive adhesives used are not critical, and examples can include emulsion pressure-sensitive adhesives, solvent-borne pressure-sensitive adhesives, photopolymerizable pressure-sensitive adhesives and hot melt pressure-sensitive adhesives (e.g., hot melt extruded pressure-sensitive adhesives).

Acrylic pressure-sensitive adhesives can include pressure-sensitive adhesives containing an acrylic polymer as a base polymer (or base resin). Though not so limited, the acrylic polymer can be prepared by subjecting to polymerization (or copolymerization) one or more alkyl (meth) acrylates as essential monomer components (main monomer components) and, where necessary, one or more monomers copolymerizable with the alkyl (meth)acrylates. Exemplary copolymerizable monomers include polar-group-containing monomers and multifunctional monomers. The polymerization can be performed, without limitation, according to any technique known in the art, such as ultraviolet polymerization, solution polymerization, or emulsion polymerization.

Alkyl (meth)acrylates for use as main monomer components of the acrylic polymer herein are alkyl (meth)acrylates each having a linear or branched-chain alkyl group, and examples include alkyl (meth)acrylates whose alkyl moiety has 1 to 20 carbon atoms, such as methyl (meth)acrylates, ethyl (meth)acrylates, propyl (meth)acrylates, isopropyl (meth)acrylates, butyl (meth)acrylates, isobutyl (meth)acrylates, s-butyl (meth)acrylates, t-butyl (meth)acrylates, pentyl (meth)acrylates, isopentyl (meth)acrylates, hexyl (meth) acrylates, heptyl (meth)acrylates, octyl (meth) acrylates, 2-ethylhexyl (meth) acrylates, isooctyl (meth)acrylates, nonyl (meth)acrylates, isononyl (meth)acrylates, decyl (meth)acrylates, isodecyl (meth)acrylates, undecyl (meth) acrylates, dodecyl (meth) acrylates, tridecyl (meth) acrylates, tetradecyl (meth) acrylates, pentadecyl (meth) acrylates, hexadecyl (meth)acrylates, heptadecyl (meth) acrylates, octadecyl (meth)acrylates, nonadecyl (meth)acrylates, and eicosyl (meth)acrylates. Among these, alkyl (meth)acrylates whose alkyl moiety has 2 to 14 carbon atoms are preferred, and alkyl (meth)acrylates whose alkyl moiety has 2 to 10 carbon atoms are more preferred.

As a primary monomer component of the acrylic polymer, the amount of alkyl (meth)acrylates is, in some embodiments, 60 percent by weight or more, and in other embodiments 80 percent by weight or more, based on the total amount of monomer components for constituting the acrylic polymer. The acrylic polymer may further contain, as monomer components, one or more copolymerizable monomers such as polar-group-containing monomers and multifunctional monomers. The presence of copolymerizable monomers as monomer components may, in some embodiments, provide the pressure-sensitive adhesive with improved adhesive strength to an adherend and/or a higher cohesive strength. Each of the different copolymerizable monomers can be used alone or in combination with others.

Exemplary polar-group-containing monomers include carboxyl-containing monomers such as (meth)acrylic acids, itaconic acid, maleic acid, fumaric acid, crotonic acid, and isocrotonic acid, along with anhydrides of them, such as maleic anhydride; hydroxyl-containing monomers including hydroxyalkyl (meth)acrylates such as hydroxyethyl (meth) acrylates, hydroxypropyl (meth) acrylates, and hydroxybutyl (meth)acrylates; amido-containing monomers such as acrylamide, methacrylamide, N,N-dimethyl(meth)acrylamides, N-methylol(meth)acrylamides, N-methoxymethyl (meth)-acrylamides, and N-butoxymethyl(meth)acrylamides; amino-containing monomers such as aminoethyl (meth)acrylates, dimethylaminoethyl (meth)acrylates, and t-butyl aminoethyl (meth) acrylates; glycidyl-containing monomers such as glycidyl (meth)acrylates and methylglycidyl (meth)acrylates; cyano-containing monomers such as acrylonitrile and methaciylonitrile; heterocycle-containing vinyl monomers such as N-vinyl-2-pyrrolidone, (meth)acryloylmorpholines, N-vinylpyridine, N-vinylpiperidone, N-vinylpyrimidine, N-vinylpiperazine, N-vinylpyrrole, N-vinylimidazole, N-vinyloxazole, and N-vinylcaprolactam; alkoxyalkyl (meth)acrylate monomers such as methoxyethyl (meth)acrylates and ethoxyethyl (meth)acrylates; sulfo-containing monomers such as sodium vinyl sulfonate; phosphate-containing monomers such as 2-hydroxyethylacryloyl phosphate; imido-containing monomers such as cyclohexylmaleimide and isopropylmaleimide; and isocyanate-containing monomers such as 2-methacryloyloxyethyl isocyanate. The amount of polar-group-containing monomers present can be 30 percent by weight or less (e.g., from 0.1 to 30 percent by weight), and preferably from 0.1 to 15 percent by weight, based on the total amount of monomer components in the acrylic polymer. Polar-group-containing monomers, if used in an amount of more than 30 percent by weight, may cause the acrylic pressure-sensitive adhesive to have an excessively high cohesive strength and thereby show insufficient tackiness. Conversely, polar-group-containing monomers, if used in an excessively small amount (e.g., less than 1 percent by weight based on the total amount of monomer components in the acrylic polymer) may not satisfactorily provide the acrylic pressure-sensitive adhesive with a sufficient cohesive strength and/or a sufficiently high shearing force.

Examples of the multifunctional monomers include hexanediol di(meth)acrylates, butanediol di(meth)acrylates, (poly)ethylene glycol di(meth)acrylates, (poly)propylene glycol di(meth)acrylates, neopentyl glycol di(meth)acrylates, pentaerythritol di(meth)acrylates, pentaerythritol tri (meth)acrylates, dipentaerythritol hexa(meth)acrylates, trimethyloipropane tri(meth)acrylates, tetramethylolmethane tri(meth)acrylates, allyl (meth)acrylates, vinyl (meth) acrylates, divinylbenzene, epoxy acrylates, polyester acrylates, and urethane acrylates. The amount of multifunctional monomers present is typically 2 percent by weight or less (e.g., from 0.01 to 2 percent by weight) and preferably 0.02 to 1 percent by weight, based on the total amount of monomer components in the acrylic polymer. Multifunctional monomers, if used in an amount of more than 2 percent by weight of the total amount of monomer components in the acrylic polymer, may cause the acrylic pressure-sensitive adhesive to have an excessively high cohesive strength, resulting in insufficient tackiness. Multifunctional monomers, if used in an excessively small amount (e.g., less than 0.01 percent by weight of the total amount of monomer components for constituting the acrylic polymer), may not provide the acrylic pressure-sensitive adhesive with a sufficient cohesive strength.

In addition to the polar-group-containing monomers and multifunctional monomers, exemplary copolymerizable monomers usable herein further include vinyl esters such as vinyl acetate and vinyl propionate; aromatic vinyl compounds such as styrene and vinyltoluene; olefins or dienes such as ethylene, butadiene, isoprene, and isobutylene; vinyl ethers such as vinyl alkyl ethers; and vinyl chloride. Exemplary copolymerizable monomers further include (meth) acrylates each having an alicyclic hydrocarbon group, such as cyclopentyl (meth)acrylates, cyclohexyl (meth)acrylates, and isobornyl (meth)acrylates.

Figure 3A:
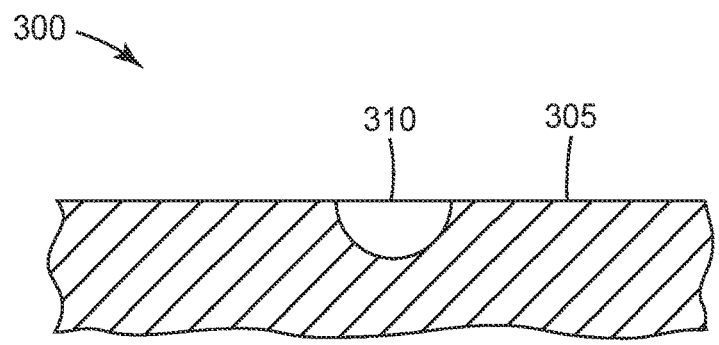
FIGS. 3A-3B illustrate a close-up of a tape including an imbedded adhesive (3A) or including an adhesive on top of the tape (3B), according to various embodiments.
Figure 3B:
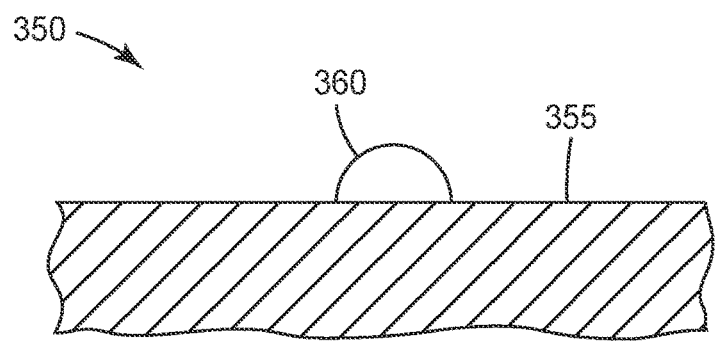

In some embodiments, the adhesive can be imbedded in the tape. In some embodiments, the first or second surface including the adhesive is flush with the surface. For example, FIG. 3A illustrates a close-up of an exemplary tape 300 including a first or second surface 305 including adhesive 310, wherein the adhesive is imbedded in the tape 300. The surface of the adhesive 310 is approximately flush with the first or second surface 305 including the adhesive 310, whereby the top surface of the adhesive 310 and the top surface of the matrix (e.g., the sealant material) are substantially coplanar. In contrast, FIG. 3B illustrates a close-up of an exemplary tape 350 including a first or second surface 355 including adhesive 360, wherein the first or second surface 355 is underneath (e.g., not flush with) the adhesive 360 such that the adhesive 360 is raised from a plane formed by the surface 355. An imbedded adhesive can be imbedded to any suitable depth, such that the distance from the deepest point of penetration to the first or second surface including the adhesive is about 0.001 microns to about 1000 microns, or about 0.1 microns to about 500 microns, or about 0.001 microns or less, or less than, equal to, or greater than about 0.01 microns, 0.1, 1, 2, 4, 6, 8, 10, 15, 20, 25, 50, 75, 100, 125, 150, 175, 200, 225, 250, 300, 350, 400, 450, 500, 600, 700, 800, 900, or about 1,000 microns or more.

The adhesive on the first or second major surface can form a pattern including the adhesive. The pattern can be either continuous or discontinuous. The adhesive pattern can include adhesive dots, adhesive lines, or a combination thereof. The lines can be straight or curved. The size of the lines or dots can be regular or random. Adhesive dots can have any suitable shape, such as a random shape or a regular shape, such as round, star-shaped, square, rectangular, polyhedral, donut-shaped, and the like. Adhesive dots can have substantially the same size or can have different sizes. Adhesive lines can have substantially the same thicknesses or can have different thicknesses. Spacing between the dots or lines (e.g., center-to-center spacing) can be random or regular.

In some embodiments, the adhesive can form an unbroken layer on the tape. However, continuous regions of adhesive (e.g., regions of adhesive unbroken by adhesive-free areas) can be potential leak points of a seal formed from the tape. Thus, it can be advantageous in some applications for the adhesive pattern to be discontinuous such that fluids cannot escape through leak paths along the plane of the tape (e.g., across opposing lateral edges of the tape). In various embodiments, the adhesive pattern includes a continuous region of adhesive-free area on the tape. The continuous region of adhesive-free area on the tape can extend along the tape in a longitudinal direction, such as for any suitable length, such as for at least about 100 m, or at least about 1 m, or at least about 1 m or less, or less than, equal to, or greater than 2 m, 3, 4, 5, 6, 8, 10, 15, 20, 25, 30, 35, 40, 45, 50, 60, 70, 80, 90, or about 100 m or more, or for the entire length of the tape. In various embodiments, the tape can be substantially free of continuous regions of adhesive extending in a latitudinal direction of the tape on the first or second major surface including the adhesive from one edge of the surface including the adhesive to the other edge of the surface including the adhesive.

Figure 4A:
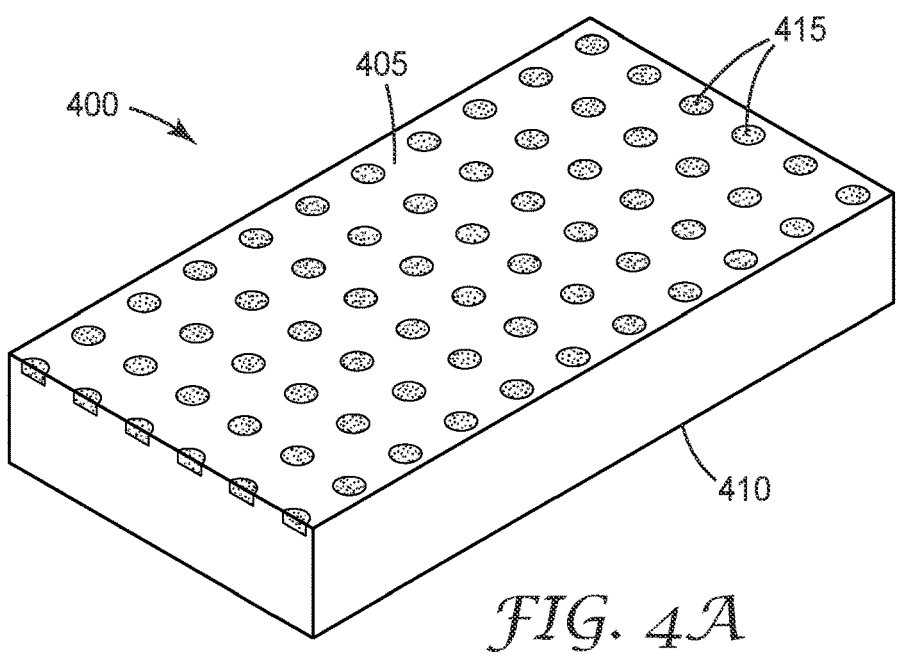
FIG. 4A illustrates a tape, according to various embodiments.

FIG. 4A illustrates an exemplary tape 400 including a first major surface 405 and a second major surface 410. The first major surface 405 includes imbedded adhesive 415 in a pattern of dots having regular spacing therebetween. The first major surface 405 includes a continuous region of adhesive-free area that extends in a longitudinal direction of the tape 400 and that extends in a latitudinal direction of the tape 400. The first major surface 405 is substantially free of continuous regions of adhesive extending in a latitudinal direction of the tape 400.

Figure 4B:
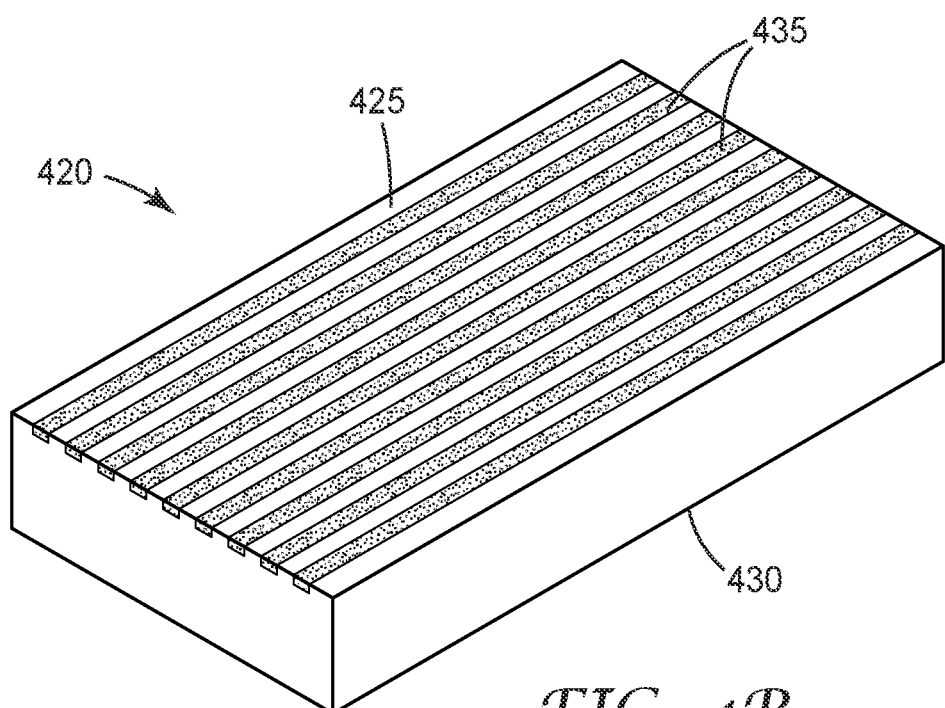
FIG. 4B illustrates a tape, according to various embodiments.

FIG. 4B illustrates an exemplary tape 420 including a first major surface 425 and a second major surface 430. The first major surface 425 includes imbedded adhesive 435 in a pattern of lines having regular spacing therebetween. The first major surface 425 includes a continuous region of adhesive-free area that extends in a longitudinal direction of the tape 420. However, the first major surface does not include a continuous region of adhesive-free area that extends in a latitudinal direction of the tape 420. The first major surface 425 is substantially free of continuous regions of adhesive extending in a latitudinal direction of the tape 420.

Figure 4C:
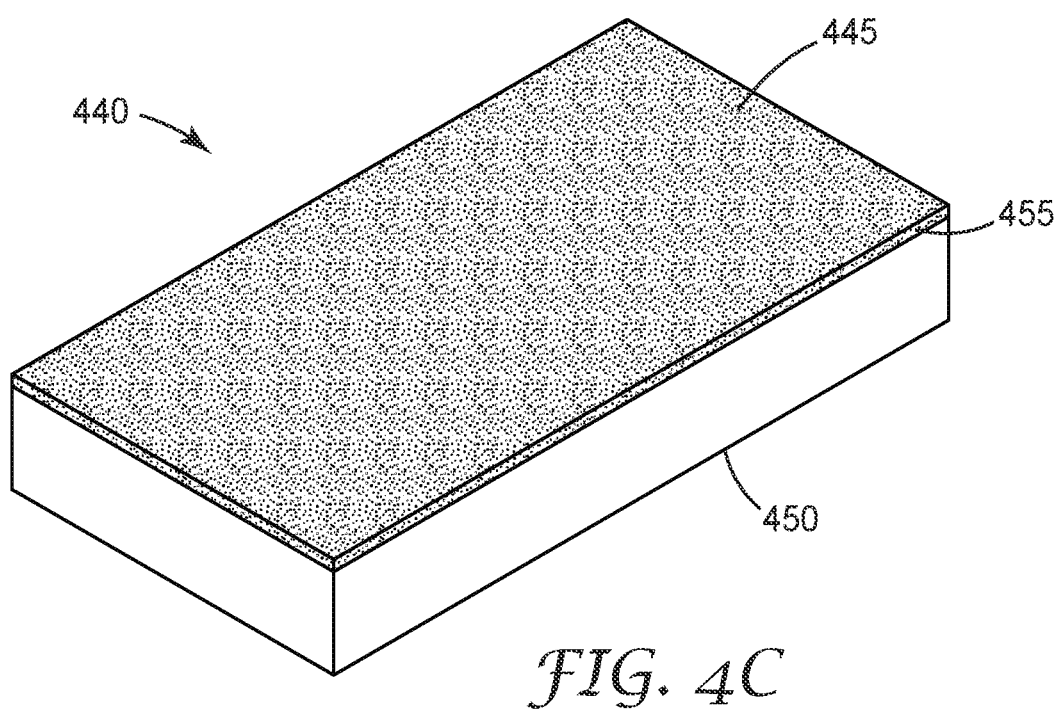
FIG. 4C illustrates a tape, according to various embodiments.

FIG. 4C illustrates an exemplary tape 440 including a first major surface 445 and a second major surface 450. The first major surface 445 includes a continuous layer of adhesive 455 that is on top of the material that forms the bulk of the tape 440 (e.g., the cured product of the sealant composition, or any other one or more polymers described herein as suitable for forming the tape). The first major surface 445 does not include a continuous region of adhesive-free area that extends in either a latitudinal or longitudinal direction. The first major surface 445 includes continuous regions of adhesive extending in a latitudinal direction of the tape.

In some embodiments, the tape further include an optional protective release film on the first major surface, on the second major surface, or on each of the first and second major surfaces. The protective release film can protect the adhesive, the optional tackiness-decreasing material, or a surface of the tape, from contacting other materials. The protective release film can be easily removed before use of the tape to form a seal.

Method of Making Tape.

In various embodiments, the present invention provides a method of making the tape including the cured product of the sealant composition. The method can be any suitable method that can generate an embodiment of the tape including the cured product of the sealant composition described herein.

The method can include curing an embodiment of the sealant composition described herein to form the cured product thereof, and forming the tape therefrom. The method can include combining adhesive and the cured product to form the tape. The combining can occur sufficiently to form imbedded adhesive or adhesive on top of the cured product. For example, combining the adhesive and the cured product can include applying the adhesive to a release liner, applying the sealant composition on top of the adhesive, and curing the sealant composition to form the cured product thereof, to form a tape including an imbedded adhesive. In another embodiment, combining the adhesive and the cured product can include curing the cured product with a surface structured for placement of the adhesive and applying the adhesive selectively to the structure of the cured product, to form a tape including an imbedded adhesive. In another embodiment, combining the adhesive and the cured product can include applying the adhesive to the cured product, to form a tape including an adhesive that is on top of the cured product. The method can also include removing the release liner from the tape.

Method of Using Tape.

In various embodiments, the present invention provides a method of using the tape including a cured product of the sealant composition to form a seal. The method can be any suitable method of forming a seal using an embodiment of the tape including a cured product of the sealant composition described herein. For example, the method can include applying the tape to a seal area, to form the seal. In another embodiment, the tape is already applied prior to the onset of the method, and a seal is formed between a panel and a seal area by placing the panel in contact with the tape on the seal area. In another embodiment, the method includes first applying the tape to a seal area, and then placing the panel in contact with the tape on the seal area, to form the seal between the panel and the seal area.

In some embodiments, the tape can be used to form a seal more rapidly than the form-in-place method, such as a 90% reduction in time required to form the seal.

EXAMPLES

Various embodiments of the present invention can be better understood by reference to the following Examples which are offered by way of illustration. The present invention is not limited to the Examples given herein.

Objects and advantages of this disclosure are further illustrated by the following non-limiting examples. Particular materials and amounts thereof recited in these examples, as well as other conditions and details, should not be construed to unduly limit this disclosure.

Unless otherwise noted, all reagents were obtained or are available from Sigma-Aldrich Company, St. Louis, Mo., or may be synthesized by known methods. Unless otherwise reported, all ratios are by weight percent.

Table 1 describes abbreviations used to describe the Examples.

TABLE 1

Abbreviations used to describe the Examples.

| Abbreviation | Meaning |
| --- | --- |
| cc | cubic centimeters |
| cm | centimeters |
| g | grams |
| in. | inches |
| LED | light emitting diode |
| mJ | millijoules |
| mL | milliliter |
| mg | milligram |
| mm | millimeter |
| MPa | megapascals |
| nm | nanometer |
| psi | pounds per square inch |
| rpm | revolutions per minute |
| $W/cm^2$ | Watt per square centimeter |
| Wt % | weight percent |
| $kg/m^3$ | kilograms per cubic meter |

Abbreviations for the materials used in the Examples are shown in Table 2.

TABLE 2

Abbreviations for the materials used in the Examples.

| Abbreviation/ Trade designation | Material |
| --- | --- |
| EXPANCEL 092DET100d25 | Poly(acrylonitrile-co-vinylidene chloride-co-methyl methacrylate) bubbles having diameters ranging from 80-120 μm (D0.5) and approximately 98% gas by volume, provided by Akzo Nobel N.V., Amsterdam, Netherlands. |
| E130-095D | Gas filled acrylonitrile copolymer bubbles having diameters ranging from 85-105 μm (Peak) and approximately 130 $kg/m^3$ provided by Chase Corporation, Westwood, MA. |
| AC350 | 3M Aerospace Sealant AC-350 B1/4 polysulfide sealant, two-part system, provided by 3M Company, St. Paul, MN. |
| P113 | Barnet P113 0.318 cm (0.125 in.) long 1.5 denier chopped polyester fibers, provided by William Barnet & Son, LLC, Spartanburg, SC. |
| 8300 Part A Resin | The resin part of a two-part sealant composition disclosed as Sealant Base SB-1 in Table 3A of International Application No. WO 2016/130673 (DeMoss et al.). |

TABLE 2-continued

Abbreviations for the materials used in the Examples.

| Abbreviation/<br>Trade designation | Material |
|---|---|
| 8300 Part B Curative | The curative part of a two-part sealant composition formulation disclosed as Catalyst C-1 in Table 3B of International Application No. WO 2016/130673 (DeMoss et al.). |
| PTFE Tape | 3M ™ PTFE Film Tape 5490 adhesive-backed polytetrafluoroethylene tape, provided by 3M Company, St Paul, MN. |
| SG15F35 | CONDUCT-O-FIL ® SG15F35 Silver Coated Glass Flake of diameters D10 = 8 μm, D50 = 19 μm, D90 = 32 μm, and having 35 weight % silver, provided by Potters Industries Inc.Valley Forge, PA |
| TALCRON MP 10-52 | TALCRON MP 10-52 Montana talc having a median particle size of 1.0 microns, provided by Barretts Minerals, Inc., Dillon, MT. |

Synthesis of Polythioether Resin.

Buttons and tapes were prepared from selected polythioether formulations on Table 3. Materials and preparation methods for these resins are generally described in International Patent Application No. WO 2016/130673 (DeMoss et al.).

Preparation of Polythioether Buttons.

Formulations for EX-14 to EX-16 and EX-23 are provided on Table 3. Mixing of 8300 Part A Resin, 8300Part B Curative, and filler was performed on a high speed mixer. 8300 Part A Resin and filler were added to a mixing cup and mixed at 2500 rpm for 1 minute. The mixture was then stirred by hand and mixed again at 2500 rpm in the speed mixer for 1 minute. After verifying that the filler was fully dispersed, Part B was then added to the mixing cup and the above mixing process repeated.

Each mixture was transferred into a cylindrical silicone rubber mold having an inner diameter of 1.27 cm (0.5 in.) diameter and a height dimension of 0.622 cm (0.245 in.) thick. To cure the polythioether buttons, the mixtures were irradiated with actinic radiation. This was carried out using an LED light array operating at a primary monomodal wavelength of 450 nm and having an output of 7.5 W/cm$^2$ for 3 minutes. The blue curing light was positioned at a distance of approximately 2.54 cm (1 inch) from the top surface of the mixture, producing a surface intensity of approximately 1.5 W/cm$^2$. The polythioether buttons were then allowed to further cure at ambient temperature for 48 hours.

Preparation of Polythioether Tapes.

Polythioether tapes were represented by Examples EX-6 to EX-16 according to the formulations in Table 3. Two different methods, Methods A and B, were used to prepare the polythioether tapes.

In Method A, 8300 Part A Resin was dispensed into a mixing cup and the filler added. This was mixed for 1 minute in a high speed mixer. 8300 Part B Curative was then dispensed into the mixing cup. Mixing took place again for 1 minute in the high speed mixer. The mixture was coated between two sheets of silicone-coated paper liners with a knife gap shown in Table 4, and subsequently cured with an LED light array as described above. The polythioether tapes were then allowed to further cure at ambient temperature for 48 hours.

Method B was identical to Method A except curing of the mixture by the LED light array was omitted, with only the ambient temperature cure taking place.

Preparation of Polysulfide Tapes.

Polysulfide tapes were represented by Examples EX-1 to EX-5 according to the formulations in Table 3.

AC350 Part A resin was dispensed into a mixing cup and the filler added. This was mixed for 1 minute in a high speed mixer. AC350 Part B was then dispensed into the mixing cup. Mixing took place again for 1 minute in the high speed mixer. Mixtures were coated between two sheets of silicone-coated paper liners with a knife gap as shown in Table 3, and the polysulfide tapes allowed to cure at ambient temperature for 48 hours.

Preparation of Adhesive Coated Liners.

Adhesive coated liner A1 was made by applying 3M™ Screen Printable Adhesive SP-7555 to the surface of a silicone coated paper liner using a stencil with circular holes having a diameter of 1 mm and a center-to-center spacing of 2 mm in a square pattern. The adhesive was cured with UV-A Energy (320-390 nm) at approximately 900 mJ/cm$^2$.

Adhesive coated liner A2 was made using the same process as above except the stencil had circular holes having a diameter of 1.5 mm in diameter and a center-to-center spacing of 3 mm.

Preparation of Polysulfide Tape with Laminated Adhesive.

Adhesive-backed polysulfide tape was made by laminating an adhesive-coated liner (either A1 or A2 above) to the open face of a polysulfide tape according to Table 6. Light hand pressure was then applied to secure the adhesive to the tape.

Preparation of Polysulfide Tapes with Imbedded Adhesive.

Polysulfide tape with imbedded adhesive was prepared by first dispensing AC350 Part A resin into a mixing cup and adding filler according to Table 3. Mixing took place for 1 minute in the high speed mixer. AC350 Part B curative was then dispensed into the mixing cup. Mixing took place again for 1 minute in the high speed mixer. Mixtures were coated between one sheet of silicone-coated paper liner and one sheet of adhesive coated liner with the adhesive facing into the gap. The polysulfide tapes were then allowed to cure at ambient temperature for 48 hours.

TABLE 3

Sealant formulations.

| Example | Resin | Part A (g) | Part B (g) | Filler | Quantity (g) | Calculated Air Fraction |
|---|---|---|---|---|---|---|
| EX-1 | AC350 | 10 | 1 | None | 0 | 0% |
| EX-2 | AC350 | 10 | 1 | Bubbles[1] | 0.05 | 41% |

TABLE 3-continued

Sealant formulations.

| Example | Resin | Part A (g) | Part B (g) | Filler | Quantity (g) | Calculated Air Fraction |
|---|---|---|---|---|---|---|
| EX-3 | AC350 | 10 | 1 | Bubbles[1] | 0.1 | 58% |
| EX-4 | AC350 | 10 | 1 | Bubbles[1] | 0.2 | 73% |
| EX-5 | AC350 | 10 | 1 | Bubbles[1] | 0.3 | 80% |
| EX-6 | 8300 | 8.35 | 0.85 | None | 0 | 0% |
| EX-7 | 8300[2] | 8.35 | 0.85 | Bubbles[1] | 0.025 | 30% |
| EX-8 | 8300 | 8.35 | 0.85 | Bubbles[1] | 0.05 | 46% |
| EX-9 | 8300[2] | 8.35 | 0.85 | Bubbles[1] | 0.075 | 56% |
| EX-10 | 8300 | 8.35 | 0.85 | Bubbles[1] | 0.1 | 62% |
| EX-11 | 8300[2] | 8.35 | 0.85 | Bubbles[1] | 0.125 | 67% |
| EX-12 | 8300 | 8.35 | 0.85 | P113 | 0.15 | 0% |
| EX-13 | 8300[2] | 8.35 | 0.85 | P113 | 0.2 | 0% |
| EX-14 | 8300[2] | 10 | 0.68 | Bubbles[3] | 0.5 | 58% |
| EX-15 | 8300[2] | 5 | 0.33 | None | 0 | 0% |
| EX-16 | 8300[2] | 5 | 0.33 | Bubbles[3] | 0.5 | 73% |
| EX-23 | 8300[2] | 10 | 0.68 | Glass[4] | 7 | 0% |

[1] Expancel 092DET100d25.
[2] Blue light cured.
[3] Chase Corporation E130-095D.
[4] SG15F35 glass flake.

Test Methods

Compression Test.

Cured compositions of Examples EX-1 to EX-16 were disposed between 0.188 inch (4.78 mm) diameter plates at a compressive force of 7.6 MPa (1100 psi) and the degree of compressive deformation measured.

Density Test.

Density measurements on the aforementioned cured compositions were obtained by weighing a cylindrical sample. Density was calculated as the weight divided by volume based on the measured diameter and thickness of the cylindrical sample.

Adhesion Test.

Adhesion of tape samples was examined by first preparing a polysulfide tape from the composition of EX-1 and disposing onto an adhesive coated liner (A1 or A2 above) with a 1.2 mm knife gap. As indicated in Table 6, the patterned adhesive was either laminated (raised) or imbedded into the polysulfide matrix. The tape was then adhesively bonded to the substrate using light hand pressure. After 2 minutes, the tape was peeled from the substrate by pulling the tape from the substrate at a 180° peel angle. Performance was recorded based on the degree of wet out, the observed ease of removal, whether there was tearing of the tape, and the presence of any residue on the surface of the substrate.

Release Test.

To simulate relative motion or installation and removal of a panel to/from a formed-in-place sealant tape, tack of the non-adhesive side of a tape on a substrate was tested with respect to a transparent acrylic plate. Polysulfide tapes were prepared based on the composition of EX-1 and the back (non-adhesive) side of the tape was applied to a transparent acrylic plate. Light hand pressure was applied to consolidate the tape and the acrylic plate. The tape was then peeled away from the acrylic plate to observe the subjective level of difficulty in effecting removal. Where noted, a tackiness-decreasing layer, such as PTFE or TALCRON MP 10-52, was applied to the back side of the tape prior to testing.

Conduction Test

Conduction was examined by first preparing polythioether buttons from selected compositions from Table 3. The resistance was measured by contacting each face of the button but a probe from an Amprobe AM-530 multi-meter (Amprobe, Everett, Wash.). Conductivity was calculated as the inverse of the measured resistance value.

Results

Results of the Compression Test, Density Test, Adhesive Test, Release Test, and Conduction Test are presented in Tables 4, 5, 6, 7, and 8 below, respectively.

TABLE 4

Compression Test results.

| Example | Resin | Filler | Filler Weight (Wt %) | Calculated Air Fraction | Knife Gap (mm) | Maximum Compression |
|---|---|---|---|---|---|---|
| EX-1 | Polysulfide | None | 0.0 | 0% | 1.0 | 71% |
| EX-2 | Polysulfide | Bubbles | 0.5 | 41% | 1.0 | 73% |
| EX-3 | Polysulfide | Bubbles | 0.9 | 58% | 1.0 | 78% |
| EX-4 | Polysulfide | Bubbles | 1.8 | 73% | 1.0 | 79% |
| EX-5 | Polysulfide | Bubbles | 2.7 | 80% | 1.0 | 81% |
| EX-6 | Polythioether | None | 0.0 | 0% | 1.0 | 68% |
| EX-7 | Polythioether | Bubbles | 0.3 | 30% | 1.0 | 71% |
| EX-8 | Polythioether | Bubbles | 0.5 | 46% | 1.0 | 81% |
| EX-9 | Polythioether | Bubbles | 0.8 | 56% | 1.0 | 76% |
| EX-10 | Polythioether | Bubbles | 1.1 | 62% | 1.0 | 75% |
| EX-11 | Polythioether | Bubbles | 1.4 | 67% | 1.0 | 66% |
| EX-12 | Polythioether | Fibers | 1.6 | 0% | 1.0 | 39% |
| EX-13 | Polythioether | Fibers | 2.2 | 0% | 1.0 | 40% |
| EX-14 | Polythioether | Bubbles | 4.7 | 58% | 6.2 | 79% |
| EX-15 | Polythioether | None | 0.0 | 0% | 6.2 | 64% |
| EX-16 | Polythioether | Bubbles | 9.4 | 73% | 6.2 | 84% |

TABLE 5

Density Test results.

| Example | Resin | Filler | Filler Weight (Wt %) | Calculated Air Fraction | Density (g/cc) |
|---|---|---|---|---|---|
| EX-1 | Polysulfide | None | 0.0 | 0% | 1.54 |
| EX-2 | Polysulfide | Bubbles | 0.5 | 41% | 1.27 |
| EX-3 | Polysulfide | Bubbles | 0.9 | 58% | 1.02 |
| EX-4 | Polysulfide | Bubbles | 1.8 | 73% | 0.77 |
| EX-5 | Polysulfide | Bubbles | 2.7 | 80% | 0.63 |
| EX-6 | Polythioether | None | 0.0 | 0% | 1.38 |
| EX-7 | Polythioether | Bubbles | 0.3 | 30% | 1.40 |

TABLE 5-continued

Density Test results.

| Example | Resin | Filler | Filler Weight (Wt %) | Calculated Air Fraction | Density (g/cc) |
|---|---|---|---|---|---|
| EX-8 | Polythioether | Bubbles | 0.5 | 46% | 0.68 |
| EX-9 | Polythioether | Bubbles | 0.8 | 56% | 0.67 |
| EX-10 | Polythioether | Bubbles | 1.1 | 62% | 0.87 |
| EX-11 | Polythioether | Bubbles | 1.4 | 67% | 0.90 |
| EX-12 | Polythioether | Fibers | 1.6 | 0% | 1.23 |
| EX-13 | Polythioether | Fibers | 2.2 | 0% | 1.16 |
| EX-14 | Polythioether | Bubbles | 4.7 | 58% | 0.8 |
| EX-15 | Polythioether | None | 0.0 | 0% | 1.1 |
| EX-16 | Polythioether | Bubbles | 9.4 | 73% | 0.6 |

TABLE 6

Adhesion Test results.

| Example | Resin | Adhesive coating | Adhesive configuration | Wet out | Observations |
|---|---|---|---|---|---|
| EX-17 | Polysulfide | A1 | Laminated | Partial; only where pressure applied | Shocky removal, with no tearing or residue |
| EX-18 | Polysulfide | A2 | Imbedded | Complete | Shocky removal, with no tearing or residue |
| EX-19 | Polysulfide | A1 | Imbedded | Complete | Smooth removal, with no tearing or residue |

TABLE 7

Release Test results.

| Example | Resin | Adhesive coating | Tackiness-decreasing layer | Observations |
|---|---|---|---|---|
| EX-20 | Polysulfide | None | None | High tack; not easily repositionable |
| EX-21 | Polysulfide | None | PTFE tape | Low tack; easily repositionable |
| EX-22 | Polysulfide | None | Talc | Low tack; easily repositionable |

TABLE 8

Conduction Test results.

| Example | Resin | Filler | Conductance (Siemens) |
|---|---|---|---|
| EX-15 | Polythioether | None | 0 |
| EX-23 | Polythioether | Conductive glass flake | 1.4 |

The terms and expressions that have been employed are used as terms of description and not of limitation, and there is no intention in the use of such terms and expressions of excluding any equivalents of the features shown and described or portions thereof, but it is recognized that various modifications are possible within the scope of the embodiments of the present invention. Thus, it should be understood that although the present invention has been specifically disclosed by specific embodiments and optional features, modification and variation of the concepts herein disclosed may be resorted to by those of ordinary skill in the art, and that such modifications and variations are considered to be within the scope of embodiments of the present invention.

Additional Embodiments

The following exemplary embodiments are provided, the numbering of which is not to be construed as designating levels of importance:

Embodiment 1 provides a sealant composition comprising:

a curable liquid comprising a polysulfide, a polythioether, a copolymer thereof, or a combination thereof; and a curing agent for curing the curable liquid.

Embodiment 2 provides the sealant composition of Embodiment 1, wherein the sealant composition is a caulk.

Embodiment 3 provides the sealant composition of any one of Embodiments 1-2, wherein the curable liquid comprises a polythioether.

Embodiment 4 provides the sealant composition of any one of Embodiments 1-3, wherein the curable liquid is about 50 wt % to about 99.9 wt % of the sealant composition.

Embodiment 5 provides the sealant composition of any one of Embodiments 1-4, wherein the curable liquid is about 80 wt % to about 98 wt % of the sealant composition.

Embodiment 6 provides the sealant composition of any one of Embodiments 1-5, wherein the curing agent comprises one or more components that react with pendant or terminal thiol groups on the polysulfide or polythioether.

Embodiment 7 provides the sealant composition of any one of Embodiments 1-6, wherein the curing agent comprises a blue light-activated curing agent that reacts with pendant or terminal thiol groups on the polysulfide or polythioether upon exposure to blue light.

Embodiment 8 provides the sealant composition of any one of Embodiments 1-7, wherein the curing agent is about 1 wt % to about 20 wt % of the sealant composition.

Embodiment 9 provides the sealant composition of any one of Embodiments 1-8, wherein the curing agent is about 3 wt % to about 10 wt % of the sealant composition.

Embodiment 10 provides the sealant composition of any one of Embodiments 1-9, wherein the sealant composition further comprises one or more fillers.

Embodiment 11 provides the sealant composition of claim 10, wherein the one or more fillers are about 0.001 wt % to about 70 wt % of the sealant composition.

Embodiment 12 provides the sealant composition of any one of Embodiments 10-11, wherein the one or more fillers are about 0.1 wt % to about 20 wt % of the sealant composition.

Embodiment 13 provides the sealant composition of any one of Embodiments 10-12, wherein the filler comprises a conductive filler, polymer bubbles, foam, corrugated filler, waffled filler, organic fibers, inorganic fibers, a silica, a silicate, a boron powder, a metal oxide, calcium sulfate, calcium carbonate, glass, kaolin, a metal, a metal alloy, a barium compound, a flaked filler, a natural filler, a polymeric filler, an anti-static agent, or a combination thereof.

Embodiment 14 provides the sealant composition of any one of Embodiments 10-13, wherein the filler comprises a conductive filler.

Embodiment 15 provides the sealant composition of any one of Embodiments 10-14, wherein the filler has a void space of about 0% to about 99.99%.

Embodiment 16 provides the sealant composition of any one of Embodiments 10-15, wherein the filler comprises a foam, polymer bubbles, foam, corrugated filler, waffled filler, or a combination thereof.

Embodiment 17 provides the sealant composition of any one of Embodiments 10-16, wherein the filler comprises polymer bubbles.

Embodiment 18 provides the sealant composition of Embodiment 17, wherein the polymer bubbles have a void space of 25% to about 96%.

Embodiment 19 provides the sealant composition of any one of Embodiments 17-18, wherein the polymer bubbles have a void space of about 25% to about 75%.

Embodiment 20 provides the sealant composition of any one of Embodiments 17-19, wherein the polymer bubbles comprise a gaseous interior and a polymer shell.

Embodiment 21 provides the sealant composition of Embodiment 20, wherein the gaseous interior is air.

Embodiment 22 provides the sealant composition of any one of Embodiments 20-21, wherein the polymer shell comprises an acrylonitrile butadiene styrene (ABS) polymer, an acrylic polymer, a celluloid polymer, a cellulose acetate polymer, a cycloolefin copolymer (COC), an ethylene-vinyl acetate (EVA) polymer, an ethylene vinyl alcohol (EVOH) polymer, a fluoroplastic, an ionomer, an acrylic/PVC alloy, a liquid crystal polymer (LCP), a polyacetal polymer (POM or acetal), a polyacrylate polymer, a polymethylmethacrylate polymer (PMMA), a polyacrylonitrile polymer (PAN or acrylonitrile), a polyamide polymer (PA, such as nylon), a polyamide-imide polymer (PAI), a polyaryletherketone polymer (PAEK), a polybutadiene polymer (PBD), a polybutylene polymer (PB), a polybutylene terephthalate polymer (PBT), a polycaprolactone polymer (PCL), a polychlorotrifluoroethylene polymer (PCTFE), a fluoropolymer, a polytetrafluoroethylene polymer (PTFE), a polyethylene terephthalate polymer (PET), a polycyclohexylene dimethylene terephthalate polymer (PCT), a poly(cyclohexylenedimethylene terephthalate-co-ethylene glycol) (PCTG), a polycarbonate polymer (PC), poly(1,4-cyclohexylidene cyclohexane-1,4-dicarboxylate) (PCCD), a polyhydroxyalkanoate polymer (PHA), a polyketone polymer (PK), a polyester polymer, a polyethylene polymer (PE), a polyetheretherketone polymer (PEEK), a polyetherketoneketone polymer (PEKK), a polyetherketone polymer (PEK), a polyetherimide polymer (PEI), a polyethersulfone polymer (PES), a polyethylenechlorinate polymer (PEC), a polyimide polymer (PI), a polylactic acid polymer (PLA), a polymethylpentene polymer (PMP), a polyphenylene oxide polymer (PPO), a polyphenylene sulfide polymer (PPS), a polyphthalamide polymer (PPA), a polypropylene polymer, a polystyrene polymer (PS), a polysulfone polymer (PSU), a polytrimethylene terephthalate polymer (PTT), a polyurethane polymer (PU), a polyvinyl acetate polymer (PVA), a polyvinyl chloride polymer (PVC), a polyvinylidene chloride polymer (PVDC), a polyamideimide polymer (PAI), a polyarylate polymer, a polyoxymethylene polymer (POM), a styrene-acrylonitrile polymer (SAN), or a combination thereof.

Embodiment 22 provides the sealant composition of any one of Embodiments 20-21, wherein the polymer shell comprises a polymer formed from one or more independently selected substituted or unsubstituted ethylenically-unsaturated $(C_1\text{-}C_{50})$hydrocarbons.

Embodiment 23 provides the sealant composition of any one of Embodiments 20-22, wherein the polymer shell comprises poly(acrylonitrile-co-vinylidene chloride-co-methyl methacrylate).

Embodiment 24 provides the sealant composition of any one of Embodiments 20-23, wherein the polymer bubbles have a particle size of about 1 micron to about 1 mm.

Embodiment 25 provides the sealant composition of any one of Embodiments 20-24, wherein the polymer bubbles have a particle size of about 10 microns to about 300 microns.

Embodiment 26 provides the sealant composition of any one of Embodiments 1-25, further comprising a gas, a blowing agent, water, saline, a base, an acid, oil, an organic solvent, an alcohol or polyol, cellulose, starch, an alkalinity control agents, an acidity control agent, a density control agent, a density modifier, an emulsifier, a dispersant, an antioxidant, a heat stabilizer, a corrosion-inhibitor, a foam control agent, a diluent, a plasticizer, a pigment, a dye, a surfactant, a salt, a rheology modifier, a curing accelerator, a curing retarder, a pH modifier, a chelating agent, an oxidizer, an adhesion promoter, a filler, or a combination thereof.

Embodiment 27 provides a method of making a cured product, the method comprising:
curing the sealant composition of any one of Embodiments 1-26 to form the cured product.

Embodiment 28 provides the method of Embodiment 27, wherein curing the sealant composition comprises subjecting the sealant composition to mixing, heat, irradiation, light, or a combination thereof.

Embodiment 29 provides a cured product of the sealant composition of any one of Embodiments 1-26.

Embodiment 30 provides the cured product of Embodiment 29, wherein the cured product comprises void space substantially homogeneously distributed therein.

Embodiment 31 provides the cured product of any one of Embodiments 29-30, wherein the cured product has a void space of about 0% to about 99%

Embodiment 32 provides the cured product of any one of Embodiments 29-31, wherein the cured product has a void space of about 25% to about 75%.

Embodiment 33 provides the cured product of any one of Embodiments 29-32, wherein the cured product has a density of about 0.1 $g/cm^3$ to about 3 $g/cm^3$.

Embodiment 34 provides the cured product of any one of Embodiments 29-33, wherein the cured product has a density of about 0.5 $g/cm^3$ to about 1.4 $g/cm^3$.

Embodiment 35 provides the cured product of any one of Embodiments 29-34, wherein the cured product has a compression at 7.6 MPa of about 20% to about 98%.

Embodiment 36 provides the cured product of any one of Embodiments 29-35, wherein the cured product has a compression at 7.6 MPa of about 60% to about 95%.

Embodiment 37 provides a tape comprising the cured product of any one of Embodiments 29-36.

Embodiment 38 provides the tape of Embodiment 37, wherein the tape has a width of about 1 mm to about 500 mm.

Embodiment 39 provides the tape of any one of Embodiments 37-38, wherein the tape has a width of about 10 mm to about 100 mm.

Embodiment 40 provides the tape of any one of Embodiments 37-39, wherein the tape has a thickness of about 0.01 mm to about 30 mm.

Embodiment 41 provides the tape of any one of Embodiments 37-40, wherein the tape has a thickness of about 0.1 mm to about 10 mm.

Embodiment 42 provides the tape of any one of Embodiments 37-41, wherein the tape is an adhesive tape.

Embodiment 43 provides the tape of any one of Embodiments 37-42, comprising a first major surface and a second major surface opposite the first major surface.

Embodiment 44 provides the tape of Embodiment 43, wherein the first major surface, the second major surface, or both the first and second major surface, comprise adhesive.

Embodiment 45 provides the tape of Embodiment 44, wherein the adhesive forms a pattern on the first or second major surface comprising the adhesive.

Embodiment 46 provides the tape of Embodiment 45, wherein the adhesive pattern comprises adhesive dots, adhesive lines, or a combination thereof.

Embodiment 47 provides the tape of Embodiment 46, wherein the adhesive pattern comprises random spacing between the adhesive dots, adhesive lines, or combination thereof.

Embodiment 48 provides the tape of Embodiment 47, wherein the adhesive pattern comprises regular spacing between the adhesive dots, adhesive lines, or combination thereof.

Embodiment 49 provides the tape of any one of Embodiments 45-48, wherein the adhesive pattern comprises a continuous region of adhesive-free area on the tape.

Embodiment 50 provides the tape of any one of Embodiments 45-49, wherein the continuous region of adhesive-free area on the tape extends in a longitudinal direction of the tape on the first or second major surface comprising the adhesive.

Embodiment 51 provides the tape of any one of Embodiments 45-50, wherein the continuous region of adhesive-free area on the tape extends in the longitudinal direction of the tape on the first or second major surface comprising the adhesive for at least about 100 mm along the length of the tape.

Embodiment 52 provides the tape of any one of Embodiments 45-51, wherein the continuous region of adhesive-free area on the tape extends in the longitudinal direction of the tape on the first or second major surface comprising the adhesive for at least about 1 m along the length of the tape.

Embodiment 53 provides the tape of any one of Embodiments 45-52, wherein the continuous region of adhesive-free area on the tape extends in the longitudinal direction of the tape on the first or second major surface comprising the adhesive for the entire length of the tape.

Embodiment 54 provides the tape of any one of Embodiments 45-53, wherein the tape is substantially free of continuous regions of adhesive extending in a latitudinal direction of the tape on the first or second major surface comprising the adhesive from one edge of the surface comprising the adhesive to the other edge of the surface comprising the adhesive.

Embodiment 55 provides the tape of any one of Embodiments 44-54, wherein the adhesive is a pressure-sensitive adhesive.

Embodiment 56 provides the tape of any one of Embodiments 44-55, wherein the adhesive is imbedded in the tape.

Embodiment 57 provides the tape of Embodiment 56, wherein the first or second surface comprising the adhesive is flush with the surface comprising the adhesive.

Embodiment 58 provides the tape of any one of Embodiments 44-57, wherein the first or second surface comprising the adhesive is raised from a plane formed by the surface.

Embodiment 59 provides the tape of any one of Embodiments 44-58, wherein the first major surface comprises adhesive and the second major surface is substantially free of adhesive.

Embodiment 60 provides the tape of Embodiment 59, wherein the tape further comprises a protective release film on the first major surface, on the second major surface, or on each of the first and second major surfaces.

Embodiment 61 provides the tape of any one of Embodiments 59-60, wherein the second surface comprises a tackiness-decreasing material.

Embodiment 62 provides the tape of Embodiment 61, wherein the tackiness-decreasing material is a dust, polytetrafluoroethylene (PTFE), polyethylene terephthalate (PET), polyether ether ketone (PEEK), polyether ketone (PEK), perfluoroalkoxy (PFA), copolymers of hexafluoropropylene, tetrafluoroethylene and ethylene (HTE), tetrafluoroethylene hexafluoropropylene vinylidene fluoride copolymer (THV), polyvinylidene difluoride (PVDF), a copolymer thereof, or a combination thereof.

Embodiment 63 provides the tape of any one of Embodiments 61-62, wherein the tackiness-decreasing material is 0.00001 wt % to about 5 wt % of the tape.

Embodiment 64 provides the tape of any one of Embodiments 61-63, wherein the tackiness-decreasing material forms a layer having a thickness of about 0.5 micron to about 200 microns Embodiment 65 provides the tape of any one of Embodiments 61-64, wherein the tackiness-decreasing material forms a layer having a thickness of about 2 microns to about 50 microns.

Embodiment 66 provides a method of using the tape of any one of Embodiments 37-65 to form a seal, the method comprising:

applying the tape to a seal area, to form the seal.

Embodiment 67 provides the method of Embodiment 66, wherein the method is a method of forming a seal between a panel and a seal area, the method further comprising:

placing the panel in contact with the tape on the seal area, to form the seal between the panel and the seal area.

Embodiment 68 provides a method of making the tape of any one of Embodiments 44-65, the method comprising combining adhesive and the cured product to form the tape.

Embodiment 69 provides the method of Embodiment 68, wherein combining the adhesive and the cured product comprises:

applying the adhesive to a release liner;

applying the sealant composition of any one of Embodiments 1-26 on top of the adhesive;

curing the sealant composition to form the cured product thereof, to form the tape.

Embodiment 70 provides the method of Embodiment 69, further comprising removing the release liner from the tape.

Embodiment 71 provides the method of any one of Embodiments 69-70, wherein the combining the adhesive and the cured product comprises:

applying the adhesive to the cured product, to form the tape.

Embodiment 72 provides a seal comprising the cured product of any one of Embodiments 29-36.

Embodiment 73 provides the seal of Embodiment 72, wherein the seal is a gasket.

Embodiment 74 provides the seal of any one of Embodiments 72-73, wherein the seal is an aerospace seal.

Embodiment 75 provides a tape comprising a cured product of a sealant composition comprising:
a curable liquid that is a polysulfide, a polythioether, a copolymer thereof, or a combination thereof;
a curing agent for the curable liquid;
polymer bubbles.

Embodiment 76 provides an adhesive-backed sealing tape comprising:
a first major surface and a second major surface opposite the first major surface, wherein the first major surface comprises an adhesive pattern comprising pressure-sensitive adhesive;
wherein the adhesive pattern comprises a continuous region of adhesive-free area on the tape that extends in a longitudinal direction of the tape, a latitudinal direction of the tape, or a combination thereof.

Embodiment 77 provides the adhesive-backed sealing tape of Embodiment 76, comprising a cured product of a curable composition.

Embodiment 78 provides the adhesive-backed sealing tape of any one of Embodiments 76-77, comprising a thermoplastic material.

Embodiment 79 provides the adhesive-backed sealing tape of any one of Embodiments 76-78, wherein the second major surface is substantially free of adhesive.

Embodiment 80 provides the adhesive-backed sealing tape of any one of Embodiments 76-79, wherein the adhesive pattern comprises a continuous region of adhesive-free area on the tape that extends in a longitudinal direction of the tape.

Embodiment 81 provides the adhesive-backed sealing tape of any one of Embodiments 76-80, wherein the adhesive pattern comprises a continuous region of adhesive-free area on the tape that extends in a latitudinal direction of the tape Embodiment 82 provides the adhesive-backed sealing tape of any one of Embodiments 76-81, wherein the tape is substantially free of continuous regions of adhesive extending in a latitudinal direction of the tape on the first major surface from one edge of the first major surface to an opposite edge of the first major surface.

Embodiment 83 provides the adhesive-backed sealing tape of any one of Embodiments 76-82, wherein the adhesive is imbedded in the tape.

Embodiment 84 provides the adhesive-backed sealing tape of any one of Embodiments 76-83, wherein the first or second surface comprising the adhesive is flush with the surface comprising the adhesive.

Embodiment 85 provides a kit comprising the tape of any one of Embodiments 37-65.

Embodiment 86 provides a tape comprising:
a cured product of a sealant composition comprising
a curable liquid comprising a polysulfide, a polythioether, a copolymer thereof, or a combination thereof; and
a curing agent for curing the curable liquid.

Embodiment 87 provides the tape of Embodiment 86, wherein the sealant composition further comprises one or more fillers.

Embodiment 88 provides the tape of Embodiment 87, wherein the one or more fillers are about 0.001 wt % to about 70 wt % of the sealant composition.

Embodiment 89 provides the tape of any one of Embodiments 86-88, wherein the filler comprises a conductive filler, polymer bubbles, foam, corrugated filler, waffled filler, organic fibers, inorganic fibers, a silica, a silicate, a boron powder, a metal oxide, calcium sulfate, calcium carbonate, glass, kaolin, a metal, a metal alloy, a barium compound, a flaked filler, a natural filler, a polymeric filler, an anti-static agent, or a combination thereof.

Embodiment 90 provides the tape of Embodiment 89, wherein the polymer bubbles comprise a gaseous interior and a polymer shell.

Embodiment 91 provides the tape of any one of Embodiments 86-90, comprising a first major surface and a second major surface opposite the first major surface, wherein the first major surface, the second major surface, or both the first and second major surface, comprise adhesive.

Embodiment 92 provides the tape of Embodiment 91, wherein the adhesive is a pressure-sensitive adhesive.

Embodiment 93 provides the tape of any one of Embodiments 91-92, wherein the adhesive is imbedded in the tape.

Embodiment 94 provides the tape of any one of Embodiments 91-93, wherein the second surface is substantially free of adhesive and comprises a tackiness-decreasing material.

Embodiment 95 provides a tape comprising:
a cured product of a sealant composition comprising
a curable liquid that is a polysulfide, a polythioether, a copolymer thereof, or a combination thereof, wherein the curable liquid is about 80 wt % to about 98 wt % of the sealant composition;
a curing agent for the curable liquid, wherein the curing agent is about 3 wt % to about 10 wt % of the sealant composition;
polymer bubbles, wherein the polymer bubbles are about 0.1 wt % to about 20 wt % of the sealant composition.

Embodiment 96 provides a method of using the tape of any one of Embodiments 86-95 to form a seal, the method comprising:
applying the tape to a seal area (e.g., a first seal area), or disposing the tape between two surfaces, to form the seal. In some embodiments, the method further comprises placing a second seal area in contact with the tape on the first seal area, to form the seal.

Embodiment 97 provides a method of making the tape of any one of Embodiments 86-95, the method comprising:
curing the sealant composition to form the cured product thereof.

Embodiment 98 provides a method of making the tape of any one of Embodiments 91-94, the method comprising
combining adhesive and the cured product to form the tape.

Embodiment 99 provides an adhesive-backed sealing tape comprising:
a first major surface and a second major surface opposite the first major surface, wherein the first major surface comprises an adhesive pattern comprising an adhesive (e.g., a pressure-sensitive adhesive, or a curable adhesive, or a combination of a pressure sensitive adhesive and a curable adhesive, wherein the adhesive is imbedded in the tape or on top of the tape);
wherein the adhesive pattern comprises a continuous region of adhesive-free area on the tape that extends in a longitudinal direction of the tape, a latitudinal direction of the tape, or a combination thereof.

Embodiment 100 provides a kit comprising the tape of any one of Embodiments 86-95, such as wherein the tape is disposed onto a roll, disposed onto a release film, encapsulated by a bag, enclosed in a box, or a combination thereof.

Embodiment 101 provides a packaged article comprising the tape of any one of claims 86-95, such as wherein the tape is disposed on a release liner, on a roll, or a combination thereof.

Embodiment 102 provides the sealant composition, cured product, tape, method, or kit, of any one or any combination of Embodiments 1-101 optionally configured such that all elements or options recited are available to use or select from.

What is claimed is:

1. A tape comprising:
    a cured product of a sealant composition comprising
        a curable liquid comprising a polysulfide, a polythioether, a copolymer thereof, or a combination thereof; and
        a curing agent for curing the curable liquid; and
        bubbles comprised of a gaseous interior and polymer shell, wherein the bubbles are 0.1 wt % to 20 wt % of the sealant composition; and
    a pressure-sensitive adhesive disposed on the cured product,
    wherein the tape comprises a first major surface and a second major surface opposite the first major surface, and further wherein the first major surface, the second major surface, or both the first and second major surfaces, comprise the pressure-sensitive adhesive.

2. The tape of claim 1, wherein the sealant composition further comprises one or more fillers.

3. The tape of claim 2, wherein the one or more fillers are about 0.001 wt % to about 70 wt % of the sealant composition.

4. The tape of claim 2, wherein the filler comprises a conductive filler, foam, corrugated filler, waffled filler, organic fibers, inorganic fibers, a silica, a silicate, a boron powder, a metal oxide, calcium sulfate, calcium carbonate, glass, kaolin, a metal, a metal alloy, a barium compound, a flaked filler, a natural filler, a polymeric filler, an anti-static agent, or a combination thereof.

5. The tape of claim 1, wherein the adhesive is imbedded in the tape.

6. The tape of claim 1, wherein the second surface is substantially free of adhesive and comprises a tackiness-decreasing material.

7. The tape of claim 1, wherein the cured product and pressure-sensitive adhesive directly contact each other.

8. A method of using the tape of claim 1 to form a seal, the method comprising: applying the tape to a seal area, to form the seal.

9. A method of making the tape of claim 1, the method comprising: curing the sealant composition to form the cured product thereof.

10. A method of making the tape of claim 1, the method comprising combining adhesive and the cured product to form the tape.

11. A packaged article comprising the tape of claim 1.

12. The packaged article of claim 11, wherein the tape is disposed on a release liner.

13. The packaged article of claim 11, wherein the tape is disposed on a roll.

14. A tape comprising:
    a cured product of a sealant composition comprising
        a curable liquid that is a polysulfide, a polythioether, a copolymer thereof, or a combination thereof, wherein the curable liquid is about 80 wt % to about 98 wt % of the sealant composition;
        a curing agent for the curable liquid, wherein the curing agent is about 3 wt % to about 10 wt % of the sealant composition;
        bubbles comprised of a gaseous interior and polymer shell, wherein the bubbles are about 0.1 wt % to about 20 wt % of the sealant composition,
    and further wherein the tape comprises a first major surface and a second major surface opposite the first major surface, wherein the first major surface, the second major surface, or both the first and second major surface, comprise a pressure-sensitive adhesive.

15. A tape assembly comprising:
    a cured product of a sealant composition comprising
        a curable liquid comprising a polysulfide, a polythioether, a copolymer thereof, or a combination thereof; and
        a curing agent for curing the curable liquid; and
        bubbles comprised of a gaseous interior and polymer shell, wherein the bubbles are 0.1 wt % to 20 wt % of the sealant composition; and
    a pressure-sensitive adhesive disposed on the cured product,
    wherein the tape assembly comprises a first major surface and a second major surface opposite the first major surface, and further wherein the first major surface, the second major surface, or both the first and second major surfaces, comprise the pressure-sensitive adhesive; and
    a release liner disposed on the pressure-sensitive adhesive.

16. The tape assembly of claim 15, wherein the cured product and pressure-sensitive adhesive directly contact each other.

* * * * *

UNITED STATES PATENT AND TRADEMARK OFFICE
CERTIFICATE OF CORRECTION

| | |
|---|---|
| PATENT NO. | : 11,584,869 B2 |
| APPLICATION NO. | : 16/466351 |
| DATED | : February 21, 2023 |
| INVENTOR(S) | : Hebert et al. |

It is certified that error appears in the above-identified patent and that said Letters Patent is hereby corrected as shown below:

In the Claims

Column 32
Line 23, In Claim 14, delete "surface" and insert -- surfaces --, therefor.

Signed and Sealed this
First Day of August, 2023

Katherine Kelly Vidal
Director of the United States Patent and Trademark Office